US009651432B2

United States Patent
Fuji et al.

(10) Patent No.: US 9,651,432 B2
(45) Date of Patent: May 16, 2017

(54) STRAIN SENSING ELEMENT, PRESSURE SENSOR, MICROPHONE, BLOOD PRESSURE SENSOR, AND TOUCH PANEL

(71) Applicant: KABUSHIKI KAISHA TOSHIBA, Tokyo (JP)

(72) Inventors: Yoshihiko Fuji, Kawasaki Kanagawa (JP); Hideaki Fukuzawa, Kawasaki Kanagawa (JP); Shiori Kaji, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 14/471,252

(22) Filed: Aug. 28, 2014

(65) Prior Publication Data
US 2015/0082900 A1   Mar. 26, 2015

(30) Foreign Application Priority Data

Sep. 20, 2013  (JP) .................................. 2013-196220

(51) Int. Cl.
*G01L 1/00* (2006.01)
*G01L 7/08* (2006.01)
(Continued)

(52) U.S. Cl.
CPC .............. *G01L 1/125* (2013.01); *G01L 9/007* (2013.01); *H04R 2201/003* (2013.01); *H04R 2499/11* (2013.01)

(58) Field of Classification Search
CPC ..... G01L 1/12; H04R 2201/003; H04R 23/00; B81B 3/00; G01R 33/091; G01R 33/093;
(Continued)

(56) References Cited

U.S. PATENT DOCUMENTS 5,168,760 A      12/1992  Wun-Fogle et al.
8,446,698 B2 *   5/2013   Fuji ....................... G01R 33/093
                                                             360/313
(Continued)

FOREIGN PATENT DOCUMENTS

JP        S57-30922        2/1982
JP        2002-148132      5/2002
(Continued)

OTHER PUBLICATIONS

Office Action issued by the Taiwanese Intellectual Property Office on Nov. 11, 2015, for Taiwanese Patent Application No. 103129909, and English-language translation thereof.
(Continued)

*Primary Examiner* — Harshad R Patel
*Assistant Examiner* — Brandi Hopkins
(74) *Attorney, Agent, or Firm* — Finnegan, Henderson, Farabow, Garrett & Dunner, LLP

(57) ABSTRACT

According to one embodiment, a strain sensing element to be provided on a deformable substrate, the element includes: a reference layer; a magnetization free layer; and a spacer layer. Magnetization of the magnetization free layer changes in accordance with deformation of the substrate. The spacer layer is provided between the reference layer and the magnetization free layer. The magnetization free layer has: a first magnetic layer; a second magnetic layer; and a magnetic coupling layer. The first magnetic layer is provided in contact with the spacer layer. The second magnetic layer is provided to be separated from the first magnetic layer. The magnetic coupling layer is provided between the first magnetic layer and the second magnetic layer. Magnetization of the first magnetic layer is anti-parallel to magnetization of the second magnetic layer.

18 Claims, 23 Drawing Sheets

(51) Int. Cl.
*G01L 1/12* (2006.01)
*G01L 9/00* (2006.01)

(58) Field of Classification Search
CPC ......... G01R 33/06; G01R 33/09; H01L 43/08; H01L 43/00; H01L 43/10; G11B 5/399; G11B 5/3906; A61B 5/022; A61B 2562/0247; A61B 5/02108; H01F 10/325; H01F 10/30; H01F 10/3254; H01F 10/3259; G01B 7/16; G01B 7/24
USPC ............ 73/779, 774, 763, 146, 862.69
See application file for complete search history.

(56) References Cited

U.S. PATENT DOCUMENTS

| 9,032,808 | B2* | 5/2015 | Giddings | G01R 33/091 |
| | | | | 73/779 |
| 2007/0186666 | A1 | 8/2007 | Ruehrig et al. | |
| 2011/0295128 | A1 | 12/2011 | Yuasa et al. | |
| 2012/0079887 | A1 | 4/2012 | Giddings et al. | |
| 2012/0206837 | A1 | 8/2012 | Fuji et al. | |
| 2012/0245477 | A1 | 9/2012 | Giddings et al. | |
| 2013/0255393 | A1 | 10/2013 | Fukuzawa et al. | |
| 2014/0137658 | A1* | 5/2014 | Higashi | H04R 19/04 |
| | | | | 73/779 |
| 2014/0369530 | A1* | 12/2014 | Fuji | A61B 5/02141 |
| | | | | 381/122 |

FOREIGN PATENT DOCUMENTS

| JP | 2011-244938 | 12/2011 |
| JP | 2012-078186 | 4/2012 |
| JP | 2012-169448 | 9/2012 |
| JP | 2012-176294 | 9/2012 |
| JP | 2012-204479 | 10/2012 |
| JP | 2013-205403 | 10/2013 |

OTHER PUBLICATIONS

Office Action issued by the Taiwanese Intellectual Property Office on Jun. 11, 2015, for Taiwanese Patent Application No. 103129909, and English-language translation thereof.

M. Löhndorf et al., "Highly sensitive strain sensors based on magnetic tunneling junctions", *Applied Physics Letters*, vol. 81, No. 2, Jul. 8, 2002. pp. 313-315.

D. Meyners et al., "Pressure sensor based on magnetic tunneling junctions", *Journal of Applied Physics*, vol. 105, 2009. pp. 07C914-1 to 07C914-3.

* cited by examiner

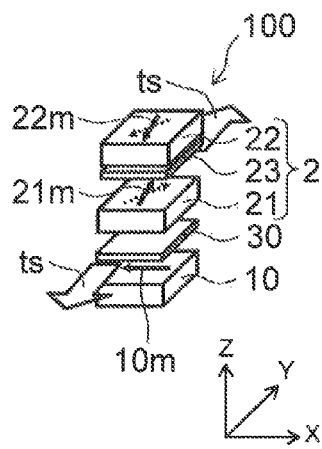 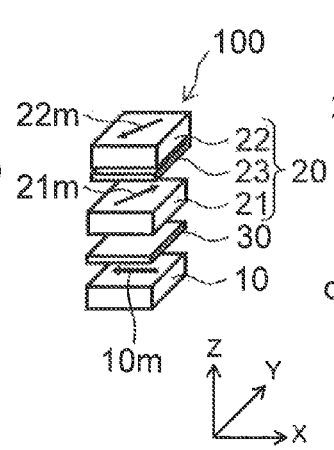 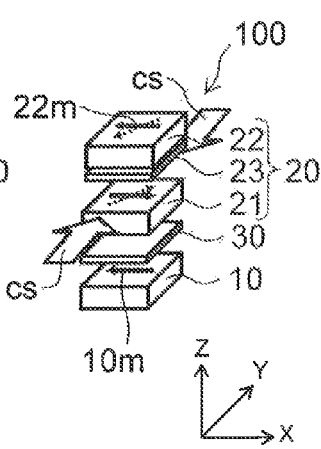
FIG. 3A    FIG. 3B    FIG. 3C
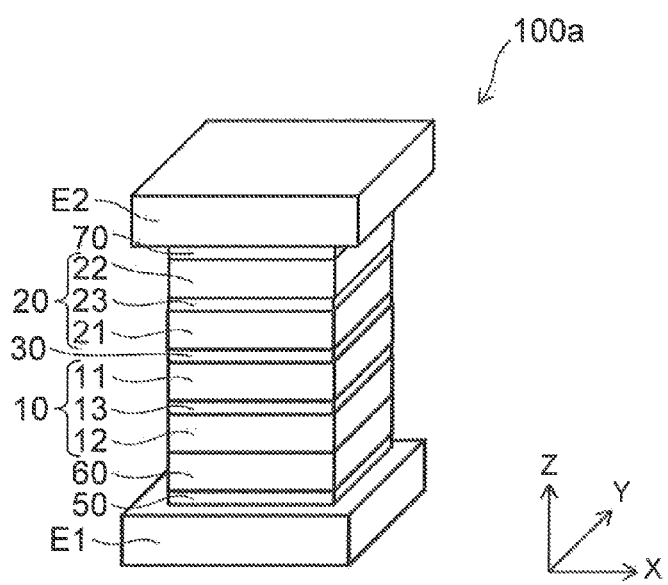
FIG. 4

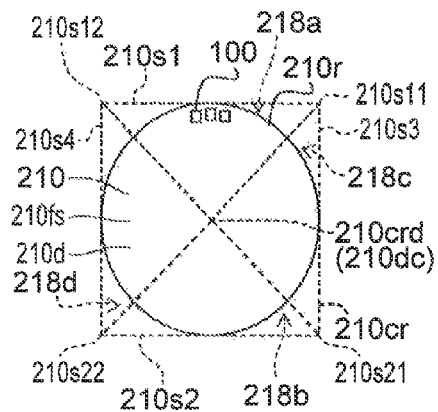
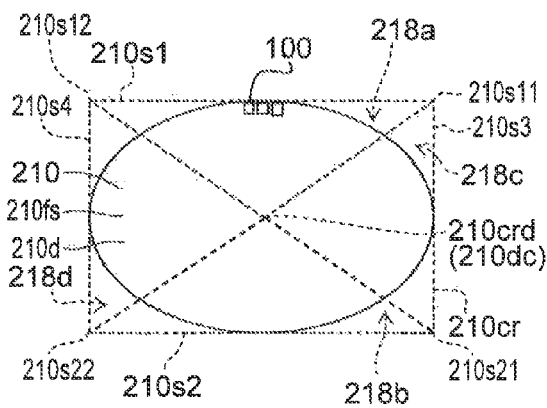
FIG. 17A    FIG. 17B
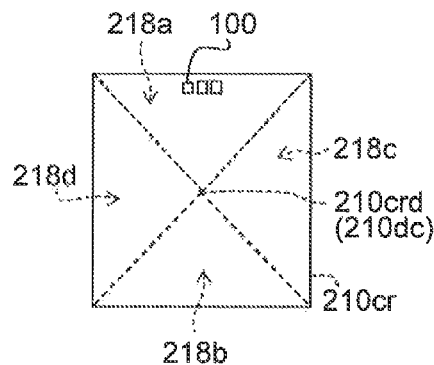
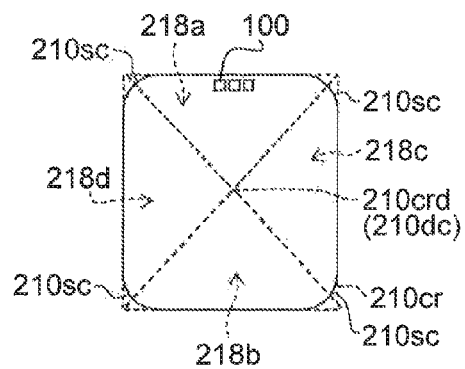
FIG. 17C    FIG. 17D
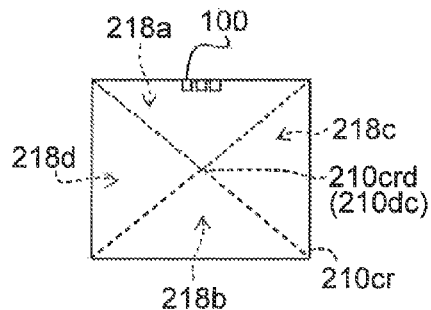
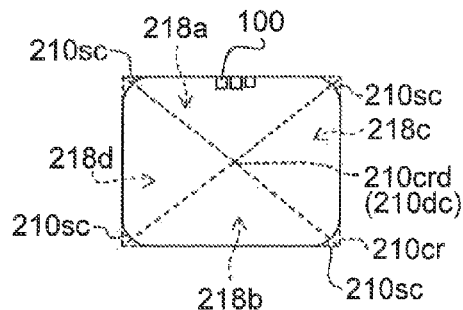
FIG. 17E    FIG. 17F

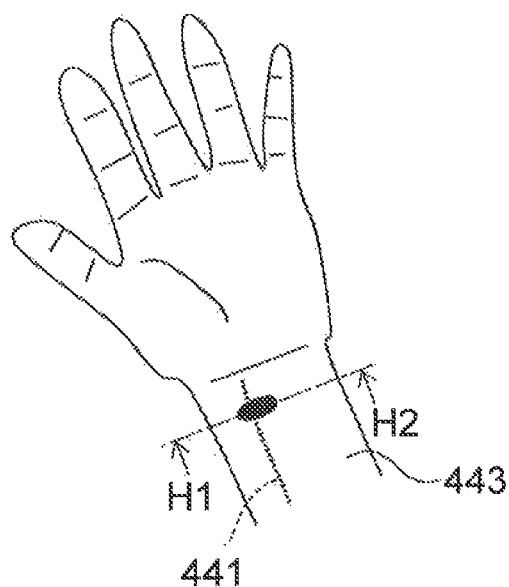
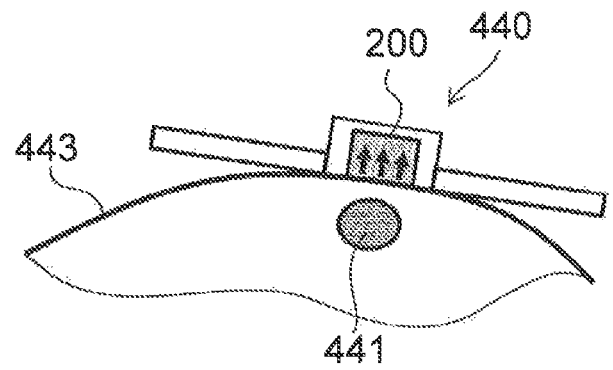
FIG. 36A    FIG. 36B
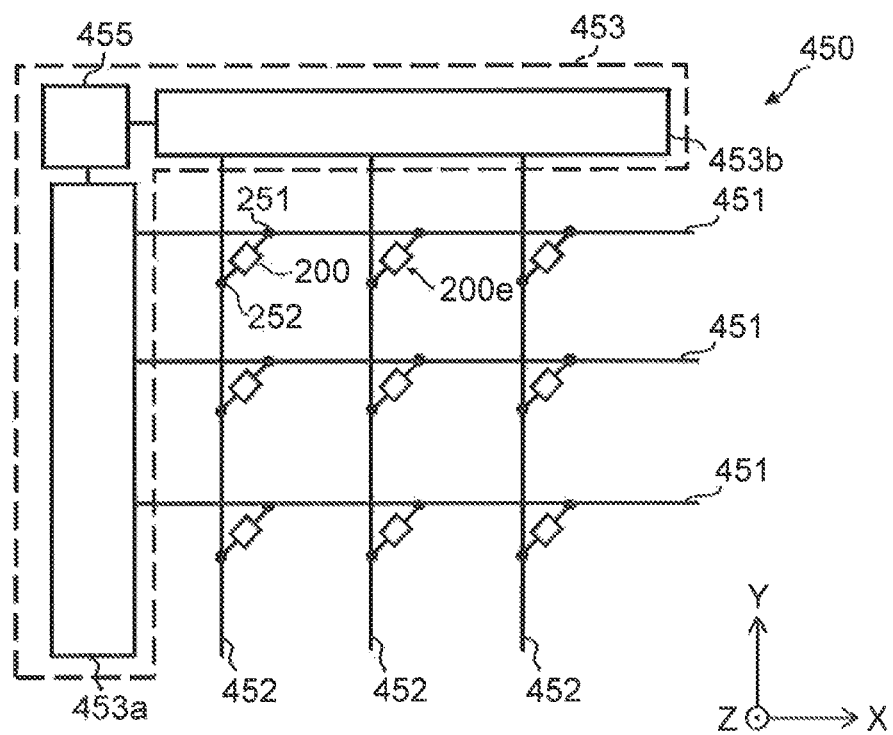
FIG. 37

STRAIN SENSING ELEMENT, PRESSURE SENSOR, MICROPHONE, BLOOD PRESSURE SENSOR, AND TOUCH PANEL

CROSS-REFERENCE TO RELATED APPLICATIONS

This application is based upon and claims the benefit of priority from Japanese Patent Application No. 2013-196220, filed on Sep. 20, 2013; the entire contents of which are incorporated herein by reference.

FIELD

Embodiments described herein relate generally to a strain sensing element, a pressure sensor, a microphone, a blood pressure sensor and a touch panel.

BACKGROUND

Pressure sensors using a MEMS (Micro Electro Mechanical Systems) technology include, for example, a piezoresistance change type and a capacitance type. On the other hand, a pressure sensor using a spinelectronics technology is proposed. In the pressure sensor using the spinelectronics technology, resistance change in accordance with strain is detected. For example, in a strain sensing element used for a pressure sensor using the spin technology, etc., the improvement in sensitivity is desired.

BRIEF DESCRIPTION OF THE DRAWINGS

FIGS. 3A to 3C are schematic views for illustrating about the function of the strain sensing element of the embodiment;

FIG. 4 is a schematic perspective view illustrating the strain sensing element according to the first embodiment;

FIGS. 17A to 17F are schematic views showing examples of disposing strain sensing elements on the substrate;

FIGS. 36A and 36B are schematic views illustrating the blood pressure sensor according to a sixth embodiment; and FIG. 37 is a schematic plan view illustrating the touch panel according to a seventh embodiment.

DETAILED DESCRIPTION

Figure 1A:
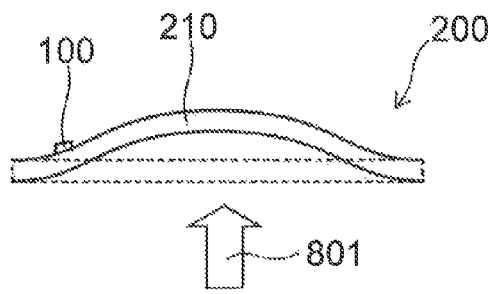
FIGS. 1A and 1B are schematic views illustrating the strain sensing element according to a first embodiment.

In general, according to one embodiment, a strain sensing element to be provided on a deformable substrate, the element includes: a reference layer; a magnetization free layer; and a spacer layer. Magnetization of the magnetization free layer changes in accordance with deformation of the substrate. The spacer layer is provided between the reference layer and the magnetization free layer. The magnetization free layer has: a first magnetic layer; a second magnetic layer; and a magnetic coupling layer. The first magnetic layer is provided in contact with the spacer layer. The second magnetic layer is provided to be separated from the first magnetic layer. The magnetic coupling layer is provided between the first magnetic layer and the second magnetic layer. Magnetization of the first magnetic layer is anti-parallel to magnetization of the second magnetic layer.

Embodiments of the invention will now be described with reference to the drawings.

The drawings are schematic or conceptual; and the relationships between the thicknesses and widths of portions, the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing that has already been shown are marked with like reference numerals, and a detailed description is omitted as appropriate.

First Embodiment

Figure 1B:
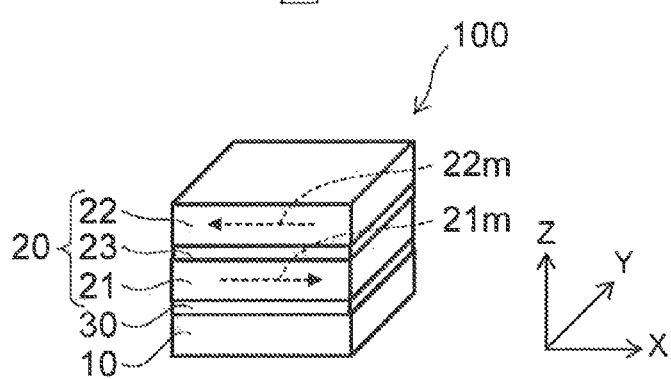

FIGS. 1A and 1B are schematic views illustrating the strain sensing element according to a first embodiment.

FIG. 1A is a schematic cross-sectional view illustrating a pressure sensor for which the strain sensing element is used. FIG. 1B is a schematic perspective view of the strain sensing element.

As shown in FIG. 1A, a strain sensing element 100 is used for a pressure sensor 200. The pressure sensor 200 includes a substrate 210 and the strain sensing element 100. The substrate 210 has a flexible region. The substrate 210 is deformable. The strain sensing element 100 is fixed to the substrate 210. In the specification of the application, the fixed state includes a state of being fixed directly and a state of being fixed indirectly by another component. For example, the state where the strain sensing element 100 is fixed to the substrate 210 includes a state where the relative position between the strain sensing element 100 and the substrate 210 is fixed. The strain sensing element 100 is provided, for example, on a part of the substrate 210.

In the specification of the application, a state of "provided on" includes, in addition to a state of being provided in direct contact, a state of being provided with another component interposed therebetween.

When force 801 is applied to the substrate 210, the substrate 210 deforms. Strain is generated in the strain sensing element 100 accompanying the deformation of the substrate 210.

In the strain sensing element 100 according to the embodiment, for example, when the substrate 210 deforms against force from the outside, strain is generated in the strain sensing element 100. The strain sensing element 100 converts the change in the strain to the change in electric resistance.

As shown in FIG. 1B, the strain sensing element 100 according to the embodiment includes a reference layer 10, a magnetization free layer 20, and a spacer layer 30.

For example, the direction going from the reference layer 10 toward the magnetization free layer 20 is defined as a Z-axis direction (stacking direction). One direction vertical to the Z-axis direction is defined as an X-axis direction. The direction vertical to the Z-axis direction and the X-axis direction is defined as a Y-axis direction.

In the magnetization free layer 20, the magnetization direction changes according to the bending of the substrate 210. The spacer layer 30 is provided between the magnetization free layer 20 and the reference 10. The magnetization free layer 20 includes a first magnetic layer 21, a magnetic coupling layer 23 (an intermediate layer), and a second magnetic layer 22. The first magnetic layer 21 is disposed in contact with the spacer layer 30. The second magnetic layer 22 is provided, separated from the first magnetic layer 21. The magnetic coupling layer 23 is provided between the first magnetic layer 21 and the second magnetic layer 22. The magnetization directions of the first magnetic layer 21 and the second magnetic layer 22 are set to be opposite to each other (anti-parallel) via the magnetic coupling layer 23.

For the first magnetic layer 21 and the second magnetic layer 22, for example, a ferromagnetic layer is used. For the reference layer 10, for example, a ferromagnetic layer is used. As the reference layer 10, a magnetization pinned layer or a magnetization free layer is used. For example, the change in magnetization of the magnetization free layer can be set to be easier than the change in magnetization of the reference layer. Consequently, as described later, when force is applied to the substrate 210 and the substrate 210 bends, the change can be generated in the relative angle between the magnetization of the magnetization free layer and the magnetization of the reference layer.

Next, an example of the operation of the strain sensing element will be described.

Figures 2A, 2B, 2C:
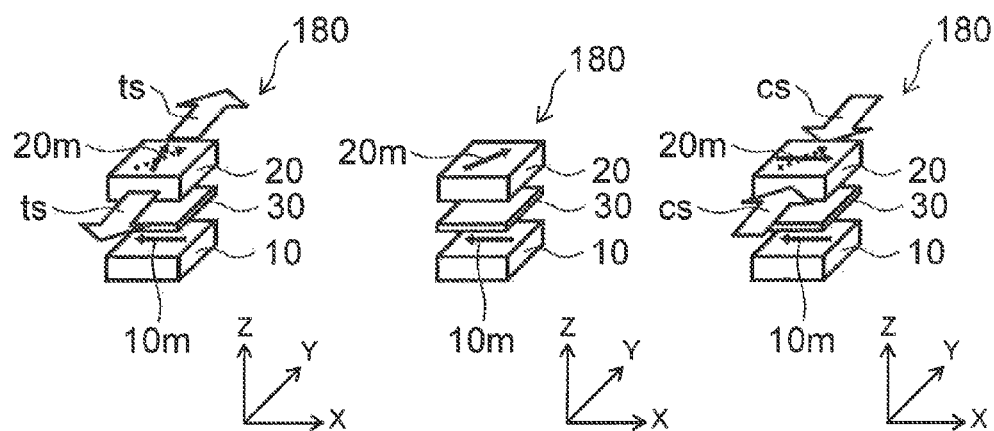
FIGS. 2A to 2C are schematic views illustrating the operation of the strain sensing element according to Comparative example.

FIGS. 2A to 2C are schematic views illustrating the operation of the strain sensing element according to Comparative example. FIG. 2A corresponds to the state where tensile stress ts is applied to the strain sensing element 100 (stretched state STt). FIG. 2B corresponds to the state where the strain sensing element 100 has no strain (strain-free state ST0). FIG. 2C corresponds to a state where compression stress cs is applied to the strain sensing element 100 (compressed state STc).

A strain sensing element 180 shown in FIGS. 2A to 2C has, as Comparative example, the magnetization free layer 20 including a magnetic layer of a single layer.

In FIGS. 2A to 2C, the case where the magnetization free layer 20 of a single layer and a magnetization pinned layer as the reference layer 10 are used is taken as an example.

The operation that the strain detection element functions as a strain sensor is based on the application of an "inverse magnetostrictive effect" and a "magnetoresistance effect." The "inverse magnetostrictive effect" can be obtained in the ferromagnetic layer used for the magnetization free layer. The "magnetoresistance effect" is expressed in a stacked film of the magnetization free layer, the spacer layer and the reference layer (magnetization pinned layer).

The "inverse magnetostrictive effect" is a phenomenon that the magnetization of a ferromagnetic material changes by strain generated in the ferromagnetic material. That is, when external strain is applied to the stacked body of the strain sensing element, the magnetization direction of the magnetization free layer changes. As the result, the relative angle between the magnetization of the magnetization free layer and the magnetization of the reference layer (magnetization pinned layer) changes. On this occasion, the change in electric resistance is caused by the "magnetoresistance effect (MR effect)." The MR effect includes, for example, a GMR (Giant magnetoresistance) effect, a TMR (Tunneling magnetoresistance) effect, etc. By applying an electric current to the stacked body and reading the change in relative angle of magnetization directions as the change in electric resistance, the MR effect is expressed. For example, strain is generated in the stacked body (strain sensing element), the strain causes the direction of magnetization of the magnetization free layer to change, and the relative angle between the direction of magnetization of the magnetization free layer and the direction of magnetization of the reference layer (magnetization pinned layer) changes. That is, the MR effect is caused by the inverse magnetostrictive effect.

When a ferromagnetic material used for the magnetization free layer has a positive magnetostriction constant, the direction of magnetization changes so that the angle between the direction of magnetization and the direction of tensile strain becomes smaller and the angle between the direction of magnetization and the direction of compression strain becomes larger. When a ferromagnetic material used for the magnetization free layer has a negative magnetostriction constant, the direction of magnetization changes so that the angle between the direction of magnetization and the direction of tensile strain becomes larger and the angle between the direction of magnetization and the direction of compression strain becomes smaller.

When the combination of materials of the stacked body of the magnetization free layer, the spacer layer and the reference layer (magnetization pinned layer) has a positive magnetoresistance effect, the electric resistance decreases when the relative angle between the magnetization free layer and the magnetization pinned layer is small. When the combination of materials of the stacked body of the magnetization free layer, the spacer layer and the reference layer (magnetization pinned layer) has a negative magnetoresistance effect, the electric resistance increases when the relative angle between the magnetization free layer and the magnetization pinned layer is small.

Hereinafter, an example of the change in the magnetization will be described about an example, in which a ferromagnetic material used for a magnetization free layer has a positive magnetostriction constant, and a stacked film of the magnetization free layer, a spacer layer and the magnetization pinned layer has a positive magnetoresistance effect.

As shown in FIG. 2B, the relative angle between magnetization $20m$ of the magnetization free layer $20$ in the initial state where no strain is applied and magnetization $10m$ of the magnetization pinned layer $10$ (reference layer $10$) can be set arbitrarily. The direction of the magnetization $20m$ of the magnetization free layer $20$ in the initial state can be set by hard bias, shape anisotropy of a strain sensing element, or the like.

When tensile strain is generated in an arrow direction in FIG. 2A, the magnetization $20m$ of the magnetization free layer $20$ changes from the initial magnetization direction without the strain so as to make the angle relative to the direction in which the tensile strain is applied smaller. In the example shown in FIG. 2A, when the tensile strain is applied, as compared with the initial magnetization direction without the strain, the relative angle between the magnetization $20m$ of the magnetization free layer $20$ and the magnetization $10m$ of the magnetization pinned layer $10$ becomes smaller, and the electric resistance of the strain sensing element $180$ decreases.

On the other hand, when compression strain is generated in the arrow direction in FIG. 2C, the magnetization $20m$ of the magnetization free layer $20$ changes from the initial magnetization direction without the strain so as to make the angle relative to the direction in which the compression strain is applied larger. In the example shown in FIG. 2C, when the compression strain is applied, as compared with the initial magnetization direction without the strain, the relative angle between the magnetization $20m$ of the magnetization free layer $20$ and the magnetization $10m$ of the magnetization pinned layer $10$ becomes larger, and the electric resistance of the strain sensing element $180$ increases.

In this way, the strain sensing element $180$ can convert the change in the strain applied to the strain sensing element $180$ to the change in the electric resistance. An amount of magnetoresistance change (dR/R) per unit strain (dε) obtained by the function is called a gauge factor (GF), and, by actualizing a strain sensing element having a high gauge factor, a strain sensor having high sensitivity can be actualized.

In the strain sensing element $180$ having the magnetization free layer $20$ of a single layer shown in FIGS. 2A to 2C, when an element dimension becomes small, there is such a case that a demagnetizing field is generated in the inside of the magnetization free layer $20$ because of an influence of a magnetic pole of the magnetization free layer $20$ at the end part of the element, to disturb the magnetization direction. The disturbance of the magnetization direction sometimes decreases the change in the relative angle between the magnetization pinned layer $10$ and the magnetization free layer $20$ caused by the strain of the strain sensing element $180$. By decreasing the demagnetizing field in the magnetization free layer $20$, a strain sensor with high sensitivity can be provided in a small element dimension.

FIGS. 3A to 3C are schematic views for illustrating about the function of the strain sensing element of the embodiment.

In FIGS. 3A to 3C, the case, where the magnetization free layer $20$ including the first magnetic layer $21$, the magnetic coupling layer $23$ and the second magnetic layer $22$, and a magnetization pinned layer being used as the reference layer $10$ are used, is taken as an example.

The strain sensing element $100$ shown in FIGS. 3A to 3C also functions as a strain sensor based on the application of the "inverse magnetostrictive effect" and the "magnetoresistance effect," as in the strain sensing element $180$ described in FIGS. 2A to 2C.

As in the strain sensing element $180$ described in FIGS. 2A to 2C, when a ferromagnetic material used for the magnetization free layer $20$ has a positive magnetostriction constant, the direction of the magnetization changes so that the angle between the direction of the magnetization and the direction of tensile strain becomes smaller, and that the angle between the direction of the magnetization and the direction of compression strain becomes larger. When a ferromagnetic material used for the magnetization free layer $20$ has a negative magnetostriction constant, the direction of the magnetization changes so that the angle between the direction of the magnetization and the direction of tensile strain becomes larger, and that the angle between the direction of the magnetization and the direction of compression strain becomes smaller.

When the combination of materials of the stacked film of the magnetization free layer $20$, the spacer layer $30$ and the magnetization pinned layer $10$ has a positive magnetoresistance effect, the electric resistance decreases when the relative angle between the magnetization free layer $20$ and the magnetization pinned layer $10$ is small. When the combination of materials of the stacked film of the magnetization free layer $20$, the spacer layer $30$ and the magnetization pinned layer $10$ has a negative magnetoresistance effect, the electric resistance increases when the relative angle between the magnetization free layer 20 and the magnetization pinned layer 10 is small.

In the case of a stacked film of a tunnel magnetoresistance effect type using an insulating layer for the spacer layer 30, when the combination of materials of a stacked film of the first magnetic layer 21 in contact with the spacer layer 30 out of the magnetization free layer 20, the spacer layer 30 and the magnetization pinned layer 10 has a positive magnetoresistance effect, the electric resistance decreases when the relative angle between magnetization 21m of the first magnetic layer 21 in the magnetization free layer 20 and the magnetization 10m of the magnetization pinned layer 10 is small. When the combination of materials of a stacked film of the first magnetic layer 21 in contact with the spacer layer 30 out of the magnetization free layer 20, the spacer layer 30 and the magnetization pinned layer 10 has a negative magnetoresistance effect, the electric resistance increases when the relative angle between the magnetization 21m of the first magnetic layer 21 in the magnetization free layer 20 and the magnetization 10m of the magnetization pinned layer 10 is small.

Hereinafter, an example of the change in the magnetization will be described about an example, in which each of ferromagnetic materials used for the first magnetic layer 21 included in the magnetization free layer 20, the second magnetic layer 22 and the magnetization pinned layer 10 has a positive magnetostriction constant, and, in a stacked film of the tunnel magnetoresistance effect using an insulating layer for the spacer layer 30, the stacked film of the first magnetic layer 21 in the magnetization free layer 20, the spacer layer 30 and the magnetization pinned layer 10 has a positive magnetoresistance effect.

As shown in FIG. 3B, the relative angles among the magnetization 21m of the first magnetic layer 21 and magnetization 22m of the second magnetic layer 22 included in the magnetization free layer 20 in the initial state where no strain is applied, and the magnetization 10m of the magnetization pinned layer 10 can be set arbitrarily. The direction of the magnetization of the magnetization free layer 20 in the initial state can be set by hard bias, shape anisotropy of a strain sensing element, or the like.

When tensile strain is generated in an arrow direction in FIG. 3A, the magnetization 20m of the magnetization free layer 20 changes from the initial magnetization direction without the strain so as to make the angle relative to the direction in which the tensile strain is applied smaller. Each of magnetization directions of the first magnetic layer 21 and the second magnetic layer 22 which are set to be anti-parallel to each other by the magnetic coupling layer 23 changes from the initial magnetization direction without the strain so as to make angles relative to the direction in which the tensile strain is applied smaller, while maintaining the anti-parallel magnetization directions. In the example shown in FIG. 3A, when the tensile strain is applied, the relative angle between the magnetization 21m of the first magnetic layer 21 in the magnetization free layer 20 and the magnetization 10m of the magnetization pinned layer 10 becomes smaller as compared with the initial magnetization direction without the strain, and the electric resistance of the strain sensing element 100 decreases.

On the other hand, when compression strain is generated in the arrow direction in FIG. 3C, the magnetization of the magnetization free layer 20 changes from the initial magnetization direction without the strain so as to make the angle relative to the direction in which the compression strain is applied larger. Each of magnetization directions of the first magnetic layer 21 and the second magnetic layer 22 which are set to be anti-parallel to each other by the magnetic coupling layer 23 changes from the initial magnetization direction without the strain so as to make angles relative to the direction in which the compression strain is applied larger, while maintaining the anti-parallel magnetization directions. In the example shown in FIG. 3C, when the compression strain is applied, the relative angle between the magnetization 21m of the first magnetic layer 21 in the magnetization free layer 20 and the magnetization 10m of the magnetization pinned layer 10 becomes larger as compared with the initial magnetization direction without the strain, and the electric resistance of the strain sensing element 100 increases.

In this way, the strain sensing element 100 can convert the change in the strain applied to the strain sensing element 100 to the change in the electric resistance. An amount of magnetoresistance change (dR/R) per unit strain (dϵ) obtained by the function is called a gauge factor (GF), and, by actualizing a strain sensing element having a high gauge factor, a strain sensor having high sensitivity can be actualized.

By using the magnetization free layer 20 including the first magnetic layer 21 and the second magnetic layer 22 that are magnetically coupled anti-parallel to each other via the magnetic coupling layer 23 as in the embodiment, the magnetic pole of the first magnetic layer 21 and the magnetic pole of the second magnetic layer 22 are coupled with polarities opposite to each other to reduce the demagnetizing field of the magnetic layer at an element end. As the result of the reduction of the demagnetizing field of the magnetization free layer 20, high strain-sensing sensitivity can be actualized also in a small element dimension. Consequently, the strain sensing element 100 satisfying both spatial resolution and high sensitivity can be provided.

An example of the strain sensing element 100 according to a first embodiment will be described.

Hereinafter, the description "material A/material B" shows the state where the layer of the material B is provided on the layer of the material A.

FIG. 4 is a schematic perspective view illustrating the strain sensing element according to the first embodiment.

As shown in FIG. 4, a strain sensing element 100a used in the embodiment includes a first electrode E1, a under layer 50, a pinning layer 60, the reference layer 10, the spacer layer 30, the magnetization free layer 20, a cap layer 70 and a second electrode E2. The reference layer 10 includes a second magnetization pinned layer 12, a first magnetization pinned layer 11, and a magnetic coupling layer 13. The magnetization free layer 20 includes the first magnetic layer 21, the magnetic coupling layer 23, and the second magnetic layer 22.

Between the first electrode E1 and the second electrode E2, the under layer 50 is provided. Between the under layer 50 and the second electrode E2, the pinning layer 60 is provided. Between the pinning layer 60 and the second electrode E2, the second magnetization pinned layer 12 is provided. Between the second magnetization pinned layer 12 and the second electrode E2, the magnetic coupling layer 13 is provided. Between the magnetic coupling layer 13 and the second electrode E2, the first magnetization pinned layer 11 is provided. Between the first magnetization pinned layer 11 and the second electrode E2, the spacer layer 30 is provided. Between the spacer layer 30 and the second electrode E2, the first magnetic layer 21 is provided. Between the first magnetic layer 21 and the second electrode E2, the magnetic coupling layer 23 is provided. Between the magnetic coupling layer 23 and the second electrode E2, the second magnetic layer 22 is provided. Between the second magnetic layer 22 and the second electrode E2, the cap layer 70 is provided.

For the under layer 50, for example, Ta/Ru is used. The thickness of the Ta layer (the length in the Z-axis direction) is, for example, 3 nanometers (nm). The thickness of the Ru layer is, for example, 2 nm.

For the pinning layer 60, for example, an IrMn layer of 7 nm in thickness is used.

For the second magnetization pinned layer 12, for example, a $Co_{75}Fe_{25}$ layer of 2.5 nm in thickness is used. For the magnetic coupling layer 13, for example, a Ru layer of 0.9 nm in thickness is used.

For the first magnetization pinned layer 11, for example, a $Co_{40}Fe_{40}B_{20}$ layer of 3 nm in thickness is used. For the spacer layer 30, for example, an MgO layer of 2.0 nm in thickness is used.

For the first magnetic layer 21 included in the magnetization free layer 20, for example, $Co_{40}Fe_{40}B_{20}$ of 4 nm in thickness is used. For the magnetic coupling layer 23, for example, a Ru layer of 0.9 nm in thickness is used. For the second magnetic layer 22 included in the magnetization free layer 20, for example, $Co_{40}Fe_{40}B_{20}$ of 3 nm in thickness is used.

For the cap layer 70, for example, Ta/Ru is used. The thickness of the Ta layer is, for example, 1 nm. The thickness of the Ru layer is, for example, 5 nm.

For the first electrode E1 and the second electrode E2, for example, at least one of aluminum (Al), an aluminum copper alloy (Al—Cu), copper (Cu), silver (Ag), and gold (Au) is used. As the result of using the material having relatively small electric resistance for the first electrode E1 and the second electrode E2, a current can be flown effectively in the strain sensing element 100a. For the first electrode E1, a nonmagnetic material can be used.

The first electrode E1 may include, for example, a under layer (not shown) for the first electrode E1, a cap layer (not shown) for the first electrode E1, and at least one layer of Al, Al—Cu, Cu, Ag or Au provided therebetween. For example, for the first electrode E1, tantalum (Ta)/copper (Cu)/tantalum (Ta), or the like is used. As the result of using Ta as the under layer for the first electrode E1, for example, the adhesiveness between the substrate 210 and the first electrode E1 is improved. For the under layer for the first electrode E1, titanium (Ti), titanium nitride (TlN), or the like may be used.

As the result of using Ta as the cap layer of the first electrode E1, the oxidation of copper (Cu) or the like below the cap layer can be prevented. For the cap layer for the first electrode E1, titanium (Ti), titanium nitride (TiN), or the like may be used.

For the under layer 50, for example, a stacked structure including a buffer layer (not shown) and a seed layer (not shown) can be used. The buffer layer, for example, reduces the roughness of the surface of the first electrode E1 or the substrate 210 to improve the crystallinity of a layer to be stacked on the buffer layer. For the buffer layer, for example, at least one selected from the group consisting of tantalum (Ta), titanium (Ti), vanadium (V), tungsten (W), zirconium (Zr), hafnium (Hf) and chromium (Cr) is used. For the buffer layer, an alloy containing at least one material selected from these materials may be used.

The thickness of the buffer layer in the under layer 50 is favorably not less than 1 nm but not more than 10 nm. The thickness of the buffer layer is preferably not less than 1 nm but not more than 5 nm. When the thickness of the buffer layer is too small, the buffering effect is lost. When the thickness of the buffer layer is too large, the thickness of the strain sensing element 100a becomes excessively large. The seed layer is formed on the buffer layer, and the seed layer can have the buffering effect. In this case, the buffer layer may be omitted. For the buffer layer, for example, a Ta layer of 3 nm in thickness is used.

The seed layer in the under layer 50 controls the crystalline orientation of a layer to be stacked on the seed layer. The seed layer controls the crystal grain diameter of a layer to be stacked on the seed layer. For the seed layer, a metal of an fcc structure (face-centered cubic structure), an hcp structure (hexagonal close-packed structure) or a bcc structure (body-centered cubic structure), or the like is used.

As the result of using ruthenium (Ru) of the hcp structure, or NiFe of the fcc structure, or Cu of the fcc structure for the seed layer in the under layer 50, for example, the crystalline orientation of a spin-valve film on the seed layer can be set to be fcc (111) orientation. For the seed layer, for example, a Cu layer of 2 nm in thickness or a Ru layer of 2 nm in thickness is used. When enhancing crystalline orientation properties of a layer to be formed on the seed layer, the thickness of the seed layer is favorably not less than 1 nm but not more than 5 nm. The thickness of the seed layer is preferably not less than 1 nm but not more than 3 nm. Consequently, the function as the seed layer for improving the crystalline orientation is exhibited sufficiently.

On the other hand, for example, in the case where crystalline orientation is unnecessary for a layer to be formed on the seed layer (for example, such a case as forming an amorphous magnetization free layer), the seed layer may be omitted. For the seed layer, for example, a Ru layer of 2 nm in thickness is used.

The pinning layer 60 gives unidirectional anisotropy, for example, to the reference layer 10 (a ferromagnetic layer) to be formed on the pinning layer 60, and fixes the magnetization 10m of the reference layer 10. For the pinning layer 60, for example, an antiferromagnetic layer is used. For the pinning layer 60, for example, at least one selected from the group consisting of IrMn, PtMn, PdPtMn and RuRhMn is used. In order to give sufficiently strong unidirectional anisotropy, the thickness of the pinning layer 60 is set appropriately.

When PtMn or PdPtMn is used for the pinning layer 60, the thickness of the pinning layer 60 is favorably not less than 8 nm but not more than 20 nm. The thickness of the pinning layer 60 is preferably not less than 10 nm but not more than 15 nm. When IrMn is used for the pinning layer 60, the unidirectional anisotropy can be given in a smaller thickness as compared with the case where PtMn is used for the pinning layer 60. In this case, the thickness of the pinning layer 60 is favorably not less than 4 nm but not more than 18 nm. The thickness of the pinning layer 60 is preferably not less than 5 nm but not more than 15 nm. For the pinning layer 60, for example, an $Ir_{22}Mn_{78}$ layer of 7 nm in thickness is used.

For the pinning layer 60, a hard magnetic layer may be used. For the hard magnetic layer, for example, CoPt (the ratio of Co is not less than 50 at. % but not more than 85 at. %), $(Co_xPt_{100-x})_{100-y}Cr_y$ (x is not less than 50 at. % but not more than 85 at. %, y is not less than 0 at. % but not more than 40 at. %), FePt (the ratio of Pt is not less than 40 at. % but not more than 60 at. %), or the like may be used.

For the second magnetization pinned layer 12, for example, a $Co_xFe_{100-x}$ alloy (x is not less than 0 at. % but not more than 100 at. %), an $Ni_xFe_{100-x}$ alloy (x is not less than 0 at. % but not more than 100 at. %), or a material obtained by adding a nonmagnetic element to these is used. For the second magnetization pinned layer 12, for example, at least one selected from the group consisting of Co, Fe and Ni is used. For the second magnetization pinned layer 12, an alloy containing at least one material selected from these materials may be used. For the second magnetization pinned layer 12, a $(Co_xFe_{100-x})_{100-y}B_y$ alloy (x is not less than 0 at. % but not more than 100 at. %, y is not less than 0 at. % but not more than 30 at. %) can also be used. As the result of using an amorphous alloy of $(Co_xFe_{100-x})_{100-y}B_y$ for the second magnetization pinned layer 12, even when the size of the strain sensing element 100a is small, variation in characteristics of strain sensing elements 100a can be suppressed.

The thickness of the second magnetization pinned layer 12 is, for example, favorably not less than 1.5 nm but not more than 5 nm. Consequently, for example, the intensity of unidirectional anisotropic magnetic field by the pinning layer 60 can be increased. For example, the intensity of an antiferromagnetic coupled magnetic field between the second magnetization pinned layer 12 and the first magnetization pinned layer 11 can be increased via the magnetic coupling layer 13 formed on the second magnetization pinned layer 12. For example, it is favorable that a magnetic thickness (the product of saturated magnetization Bs and thickness t (Bs·t)) of the second magnetization pinned layer 12 is substantially equal to the magnetic thickness of the first magnetization pinned layer 11.

Saturated magnetization of $Co_{40}Fe_{40}B_{20}$ in a thin film is about 1.9 T (tesla). For example, when a $Co_{40}Fe_{40}B_{20}$ layer of 3 nm in thickness is used for the first magnetization pinned layer 11, the magnetic thickness of the first magnetization pinned layer 11 is 1.9 T×3 nm, which is 5.7 Tnm. On the other hand, the saturated magnetization of $Co_{75}Fe_{25}$ is about 2.1 T. A thickness of the second magnetization pinned layer 12 that gives the same magnetic thickness as above is 5.7 Tnm/2.1 T, that is, 2.7 nm. In this case, for the second magnetization pinned layer 12, a $Co_{75}Fe_{25}$ layer of about 2.7 nm in thickness is favorably used. For the second magnetization pinned layer 12, for example, a $Co_{75}Fe_{25}$ layer of 2.5 nm in thickness is used.

In the strain sensing element 100a, for the first magnetic layer 21, a synthetic pin structure is used by the second magnetization pinned layer 12, the magnetic coupling layer 13 and the first magnetization pinned layer 11. For the first magnetic layer 21, a single pin structure including a magnetization pinned layer of one layer may be used. When the single pin structure is used, for the magnetization pinned layer, for example, a $Co_{40}Fe_{40}B_{20}$ layer of 3 nm in thickness is used. As a ferromagnetic layer used for a magnetization pinned layer of the single pin structure, a material same as the material of the second magnetization pinned layer 12 may be used.

The magnetic coupling layer 13 generates an antiferromagnetic coupling between the second magnetization pinned layer 12 and the first magnetization pinned layer 11. The magnetic coupling layer 13 forms the synthetic pin structure. For the magnetic coupling layer 13, for example, Ru is used. The thickness of the magnetic coupling layer 13 is, for example, favorably not less than 0.8 nm but not more than 1 nm. For the magnetic coupling layer 13, a material other than Ru may be used, if it is a material that generates a sufficient antiferromagnetic coupling between the second magnetization pinned layer 12 and the first magnetization pinned layer 11. The thickness of the magnetic coupling layer 13 can be set to be a thickness of not less than 0.8 nm but not more than 1 nm corresponding to the second peak (2nd peak) of an RKKY (Ruderman-Kittel-Kasuya-Yosida) coupling. Furthermore, the thickness of the magnetic coupling layer 13 may be set to be a thickness of not less than 0.3 nm but not more than 0.5 nm corresponding to the first peak (1st peak) of the RKKY coupling. As the magnetic coupling layer 13, for example, Ru of 0.9 nm in thickness is used. Consequently, the coupling with high reliability can be obtained more stably.

The magnetic layer used for the first magnetization pinned layer 11 contributes directly to the MR effect. For the first magnetization pinned layer 11, for example, a Co—Fe—B alloy is used. Specifically, for the first magnetization pinned layer 11, a $(Co_xFe_{100-x})_{100-y}B_y$ alloy (x is not less than 0 at. % but not more than 100 at. %, y is not less than 0 at. % but not more than 30 at. %) may also be used. When an amorphous alloy of $(Co_xFe_{100-x})_{100-y}B_y$ is used for the first magnetization pinned layer 11, for example, even when the size of the strain sensing element 100a is small, variation in elements caused by a crystal grain can be suppressed.

A layer formed on the first magnetization pinned layer 11 (such as a tunnel insulating layer (not shown)) can be planarized. The planarization of the tunnel insulating layer can decrease a defect density of the tunnel insulating layer. Consequently, a larger rate of MR change is obtained with a lower areal resistance. For example, when MgO is used as a material of the tunnel insulating layer, as the result of using an amorphous alloy of $(Co_xFe_{100-x})_{100-y}B_y$ for the first magnetization pinned layer 11, (100) orientation of an MgO layer formed on the tunnel insulating layer can be improved. By making the (100) orientation of the MgO layer better, a larger rate of MR change is obtained. The $(Co_xFe_{100-x})_{100-y}B_y$ alloy crystallizes using the (100) plane of the MgO layer as a template in annealing. Therefore, good crystal matching between MgO and the $(Co_xFe_{100-x})_{100-y}B_y$ alloy is obtained. As the result of obtaining good crystal matching, a larger rate of MR change is obtained.

For the first magnetization pinned layer 11, in addition to a Co—Fe—B alloy, for example, an Fe—Co alloy may be used.

When the first magnetization pinned layer 11 is thicker, a larger rate of MR change is obtained. In order to obtain a larger fixed magnetic field, favorably the first magnetization pinned layer 11 is thinner. Between the rate of MR change and the uniaxial magnetic field, there exists a trade-off relationship in the thickness of the first magnetization pinned layer 11. When a Co—Fe—B alloy is used for the first magnetization pinned layer 11, the thickness of the first magnetization pinned layer 11 is favorably not less than 1.5 nm but not more than 5 nm. The thickness of the first magnetization pinned layer 11 is preferably not less than 2.0 nm but not more than 4 nm.

For the first magnetization pinned layer 11, in addition to above-mentioned materials, a $Co_{90}Fe_{10}$ alloy of the fcc structure, or Co of the hcp structure, or a Co alloy of the hcp structure is used. For the first magnetization pinned layer 11, for example, at least one selected from the group consisting of Co, Fe and Ni is used. For the first magnetization pinned layer 11, an alloy containing at least one material selected from these materials is used. The use of an FeCo alloy material of the bcc structure, a Co alloy containing a cobalt composition of not less than 50 at. %, or a material of an Ni composition (Ni alloy) of not less than 50 at. % for the first magnetization pinned layer 11, for example, gives a larger MR ratio.

As the first magnetization pinned layer 11, for example, a layer of Heusler magnetic alloy such as $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$ and $Co_2FeGa_{0.5}Ge_{0.5}$ can also be used.

For example, as the first magnetization pinned layer 11, for example, a $Co_{40}Fe_{40}B_{20}$ layer of 3 nm in thickness is used.

The spacer layer 30 decouples, for example, the magnetic coupling of the reference layer 10 and the magnetization free layer 20. For the spacer layer 30, for example, a metal, or an insulator, or a semiconductor is used. As the metal, for example, Cu, Au, Ag or the like is used. When the metal is used for the spacer layer 30, the thickness of the spacer layer 30 is, for example, approximately not less than 1 nm but not more than 7 nm. As the insulator or the semiconductor, for example, a magnesium oxide (such as MgO), an aluminum oxide (such as $Al_2O_3$), a titanium oxide (such as TiO), a zinc oxide (such as ZnO), a gallium oxide (Ga—O), or the like is used. When an insulator or a semiconductor is used for the spacer layer 30, the thickness of the spacer layer 30 is, for example, approximately not less than 0.6 nm but not more than 2.5 nm. As the spacer layer 30, for example, a CCP (Current-Confined-Path) spacer layer may be used. When the CCP spacer layer is used as a spacer layer, for example, a structure, in which a copper (Cu) metal path is formed in the insulating layer of aluminum oxide ($Al_2O_3$), is used. For example, as the spacer layer 30, an MgO layer of 1.5 nm in thickness is used.

In the magnetization free layer 20, the first magnetic layer 21, the magnetic coupling layer 23, and the second magnetic layer 22 stacked in order are included. For the first magnetic layer 21 and the second magnetic layer 22, for example, a ferromagnetic material is used. The magnetic coupling layer 23 generates the antiferromagnetic coupling between the first magnetic layer 21 and the second magnetic layer 22. The magnetic coupling layer 23 forms a synthetic free structure. For the magnetic coupling layer 23, for example, Ru is used. The thickness of the magnetic coupling layer 23 is favorably not less than 0.8 nm but not more than 1 nm. A material other than Ru may be used for the magnetic coupling layer 23, if it is a material that generates a sufficient antiferromagnetic coupling between the first magnetic layer 21 and the second magnetic layer 22. The thickness of the magnetic coupling layer 23 can be set to be a thickness of not less than 0.8 nm but not more than 1 nm corresponding to the second peak (2nd peak) of the RKKY (Ruderman-Kittel-Kasuya-Yosida) coupling. Furthermore, the thickness of the magnetic coupling layer 23 may be set to be a thickness of not less than 0.3 nm but not more than 0.6 nm corresponding to the first peak (1st peak) of the RKKY coupling. As the magnetic coupling layer 23, for example, Ru of 0.9 nm in thickness is used. Consequently, a coupling with high reliability is obtained more stably. Rh, Ir or the like can be used instead of Ru.

In the embodiment, as the result of using a synthetic type free layer including the first magnetic layer 21 and the second magnetic layer 22 coupled anti-parallel to each other for the magnetization free layer 20, high strain sensitivity can be actualized even in a small element dimension.

As the material of the first magnetic layer 21 and the second magnetic layer 22, for example, a ferromagnetic material containing Fe, Co or Ni is used. As the material of the first magnetic layer 21 and the second magnetic layer 22, for example, an FeCo alloy, an NiFe alloy or the like is used. Furthermore, for the magnetization free layer 20, a Co—Fe—B alloy, an Fe—Co—Si—B alloy, an Fe—Ga alloy having large λs (magnetostriction constant), an Fe—Co—Ga alloy, a Tb-M-Fe alloy, a Tb-M1-Fe-M2 alloy, an Fe-M3-M4-B alloy, Ni, Fe—Al, ferrite or the like is used. In the above-mentioned Tb-M-Fe alloy, M is at least one selected from the group consisting of Sm, Eu, Gd, Dy, Ho and Er. In the Tb-M1-Fe-M2 alloy, M1 is at least one selected from the group consisting of Sm, Eu, Gd, Dy, Ho and Er. M2 is at least one selected from the group consisting of Ti, Cr, Mn, Co, Cu, Nb, Mo, W and Ta. In the Fe-M3-M4-B alloy, M3 is at least one selected from the group consisting of Ti, Cr, Mn, Co, Cu, Nb, Mo, W and Ta. M4 is at least one selected from the group consisting of Ce, Pr, Nd, Sm, Tb, Dy and Er. Examples of the ferrite include $Fe_3O_4$, $(FeCo)_3O_4$, etc. The thickness of the magnetization free layer 20 is, for example, not less than 2 nm.

For the first magnetic layer 21 and the second magnetic layer 22, a magnetic material containing boron may be used. For example, for the magnetization free layer 20, for example, an alloy containing at least one element selected from Fe, Co and Ni, and boron (B) can be used. For example, a $Co_{40}Fe_{40}B_{20}$ alloy can be used. When the alloy containing at least one element selected from Fe, Co and Ni, and boron (B) is used for the magnetization free layer 20, Ga, Al, Si, W or the like may be added as an element that accelerates high magnetostriction. For example, an Fe—Ga—B alloy, or an Fe—Co—Ga—B alloy, or an Fe—Co—Si—B alloy may be used. The use of the magnetic material that contains boron can lower the coercivity (He) of the magnetization free layer 20 and make the change in the magnetization direction relative to strain easy, to give high strain sensitivity.

The concentration of B contained in at least one magnetic layer of the first magnetic layer 21 and the second magnetic layer 22 is favorably not less than 5 at. % from the viewpoint of obtaining an amorphous structure, and is favorably not more than 35 at. % because the magnetostriction decreases if the B concentration is too high. That is, the B concentration is favorably not less than 5 at. % but not more than 35 at. %, and preferably not less than 10 at % but not more than 30 at. %.

For example, for a stacked structure of the first magnetic layer 21/magnetic coupling layer 23/second magnetic layer 22, Co—Fe—B (4 nm) (first magnetic layer 21)/Ru (0.9 nm) (magnetic coupling layer 23)/Co—Fe—B (2 nm) (second magnetic layer 22), or the like can be used.

When $Fe_{1-y}B_y$ ($0<y\le0.3$), or $(Fe_aX_{1-a})_{1-y}B_y$ (X=Co or Ni, $0.8\le a<1$, $0<y\le0.3$) is used for a part of at least one magnetic layer of the first magnetic layer 21 and the second magnetic layer 22, since it becomes easy to satisfy both a large magnetostriction constant λ and low coercivity, the use is particularly favorable from the viewpoint of obtaining a high gauge factor.

For example, for a stacked structure of the first magnetic layer 21/magnetic coupling layer 23/second magnetic layer 22, $Co_{40}Fe_{40}B_{20}$ (0.5 nm)/$Fe_{80}B_{20}$ (4 nm)/$Co_{40}Fe_{40}B_{20}$ (0.5 nm) (first magnetic layer 21)/Ru (0.9 nm) (magnetic coupling layer 23)/Co—Fe—B (0.5 nm)/$Fe_{80}B_{20}$ (4 nm) (second magnetic layer 22), or the like can be used.

Figure 5:
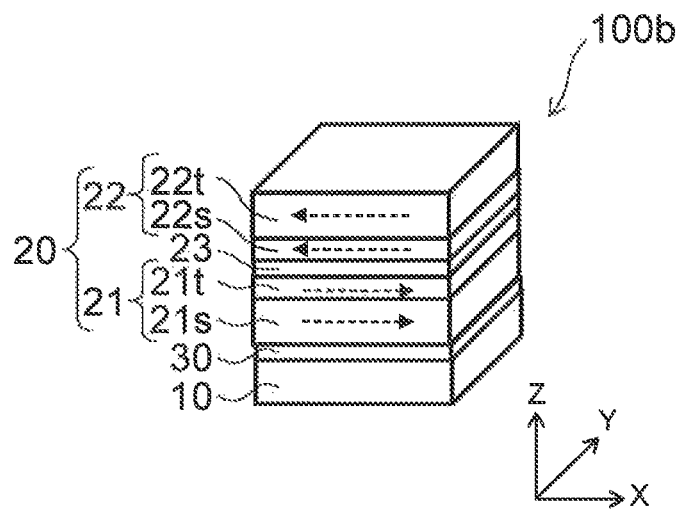
FIG. 5 is a schematic perspective view illustrating another example of the magnetization free layer.

FIG. 5 is a schematic perspective view illustrating another example of the magnetization free layer.

As in a strain sensing element 100b shown in FIG. 5, each of the first magnetic layer 21 and the second magnetic layer 22 may have a multi-layer structure. In the example, the first magnetic layer 21 includes a first magnetic film 21s and a second magnetic film 21t. In the example, the second magnetic layer 22 includes a first magnetic film 22s and a second magnetic film 22t.

As shown in FIG. 5, the first magnetic layer 21 is a magnetic layer in contact with the spacer layer 30. When a tunnel insulating layer of MgO is used as the spacer layer 30, it is favorable to provide a layer of a Co—Fe—B alloy at the interface in contact with the spacer layer 30. Consequently, a high magnetoresistance effect is obtained. In this case, it is possible to provide the layer of the Co—Fe—B alloy on the spacer layer 30, and to provide another magnetic material having a large magnetostriction constant thereon. In this case, the absolute value of magnetostriction constant of the second magnetic layer 22 is larger than the absolute value of magnetostriction constant of the first magnetic layer 21.

At the interface between the first magnetic layer 21 and the magnetic coupling layer 23, and at the interface between the second magnetic layer 22 and the magnetic coupling layer 23, it is desired to dispose a magnetic layer containing Co. When Ru is used for the magnetic coupling layer 23, in order to obtain stably the antiferromagnetic coupling via Ru, it is desired to dispose a magnetic layer containing Co at the interface of Ru. For example, at the interface of the magnetic coupling layer 23, Co, a Co—Fe alloy, or a Co—Fe—B alloy can be used.

Out of the first magnetic layer 21 and the second magnetic layer 22, at the interface between the magnetic layer disposed in a lower part of the magnetic coupling layer 23 (in the example, the second magnetic film 21$t$) and the magnetic coupling layer 23, it is desired to dispose a magnetic layer having a crystalline structure. As the result of disposing the magnetic layer having a crystalline structure, for example, the crystallinity of Ru used for the magnetic coupling layer 23 can be improved, and the antiferromagnetic coupling via Ru can be obtained stably. For example, at the lower part interface of the magnetic coupling layer 23, Co of the hcp structure, or a Co—Fe alloy of the fcc structure or a Co—Fe alloy of the bcc structure can be used. In examples shown in FIGS. 4 and 5, since the first magnetic layer 21 is disposed in the lower part of the magnetic coupling layer 23, it is favorable to use a magnetic layer having a crystalline structure at the interface between the first magnetic layer 21 and the magnetic coupling layer 23.

When each of the first magnetic layer 21 and the second magnetic layer 22 has a multi-layer structure as described above, for example, Co—Fe—B (1 nm)/Fe—Co—Si—B (3 nm)/Co—Fe (0.5 nm) (first magnetic layer 21)/Ru (0.9 nm) (magnetic coupling layer 23)/Co—Fe—B (1 nm)/Fe—Co—Si—B (2 nm) (second magnetic layer 22) or the like can be used.

Magnetic thicknesses of the first magnetic layer 21 and the second magnetic layer 22 can be adjusted appropriately in accordance with the object. For example, for the purpose of reducing the influence of the demagnetizing field by the magnetic pole generated at the element end of the magnetization free layer 20, it is desired to make magnetic thicknesses of the first magnetic layer 21 and the second magnetic layer 22 even. As described later, when a plurality of strain sensing elements of the embodiment are disposed in proximity to one another, leakage magnetic fields from each of the magnetization free layers 20 of the plurality of strain sensing elements sometimes interfere with one another to give an adverse effect on the operation of a strain sensing element. In such a case, by making magnetic thicknesses of the first magnetic layer 21 and the second magnetic layer 22 even, the leakage magnetic field from the magnetization free layers 20 coupled anti-parallel to each other toward the outside can be made approximately zero.

For the purpose of suppressing the leakage magnetic field toward the outside to the minimum, for example, it is favorable to set the difference in magnetic thicknesses of the first magnetic layer 21 and the second magnetic layer 22 to be not more than 2 T·nm (tesla·nanometer), and is preferable to set the difference to be not more than 1 T·nm (tesla·nanometer). For example, in the case where $Co_{40}Fe_{40}B_{20}$ is used for each of the first magnetic layer 21 and the second magnetic layer 22, when $Co_{40}Fe_{40}B_{20}$ (4 nm) is used for the first magnetic layer 21, the saturated magnetization of $Co_{40}Fe_{40}B_{20}$ in a thin film is about 1.9 T (tesla). Therefore, the magnetic thickness of the first magnetic layer 21 becomes 7.6 T·nm. In this case, for example, the magnetic thickness of the second magnetic layer 22 can be set favorably to be not less than 5.6 T·nm but not more than 9.6 T·nm, preferably to be not less than 6.6 T·nm but not more than 8.6 T·nm. That is, the thickness of the $Co_{40}Fe_{40}B_{20}$ of the second magnetic layer 22 can be set favorably to be not less than 3 nm but not more than 5 nm, preferably to be not less than 3.5 nm but not more than 4.5 nm.

On the other hand, when the initial magnetization direction of the magnetization free layer 20 is to be controlled using a hard bias element to be described later, it is desired that the difference in magnetic thicknesses of the first magnetic layer 21 and the second magnetic layer 22 is large to some degree. In the case of an object of controlling the initial magnetization direction of the magnetization free layer 20 with a hard bias structure, the difference in magnetic thicknesses between the first magnetic layer 21 and the second magnetic layer 22 is set favorably to be not less than 0.5 T·nm (tesla·nanometer), preferably to be not less than 1 T·nm (tesla·nanometer). For example, in the case where $Co_{40}Fe_{40}B_{20}$ is used for each of the first magnetic layer 21 and the second magnetic layer 22, when $Co_{40}Fe_{40}B_{20}$ (4 nm) is used for the first magnetic layer 21, the saturated magnetization of $Co_{43}Fe_{40}B_{20}$ in a thin film is about 1.9 T (tesla). Therefore, the magnetic thickness of the first magnetic layer 21 becomes 7.6 T·nm. In this case, for example, the magnetic thickness of the second magnetic layer 22 can be set to be not more than 7.1 T·nm or not less than 8.1 T·nm, preferably to be not more than 6.6 T·nm or not less than 8.6 T·nm. That is, the thickness of $Co_{40}Fe_{40}B_{20}$ of the second magnetic layer 22 can be set to be not more than 3.7 T·nm or not less than 4.3 T·nm, preferably to be not more than 3.5 T·nm or not less than 4.5 T·nm.

Figure 6:
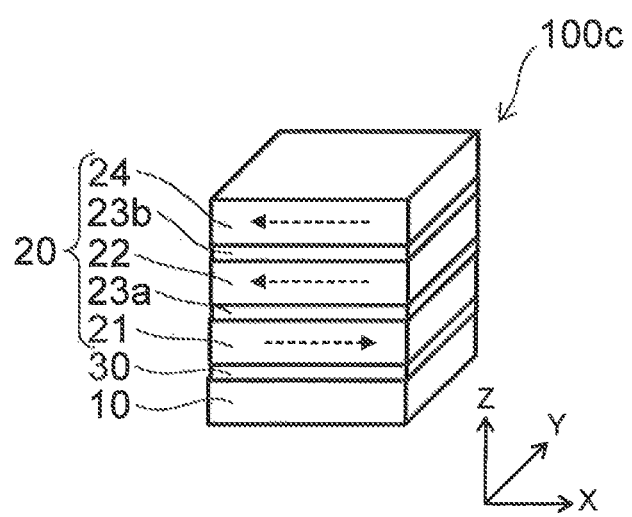
FIG. 6 is a schematic perspective view illustrating another example of the magnetization free layer.

FIG. 6 is a schematic perspective view illustrating another example of the magnetization free layer.

As in a strain sensing element 100$c$ shown in FIG. 6, magnetic layers coupled anti-parallel to each other via the magnetic coupling layer used for the magnetization free layer 20 may be provided in not less than three layers. For example, the first magnetic layer 21/first magnetic coupling layer 23$a$/second magnetic layer 22/second magnetic coupling layer 23$b$/third magnetic layer 24 can be used. In this case, for the first magnetic coupling layer 23$a$ and the second magnetic coupling layer 23$b$, the same material as aforementioned material for the magnetic coupling layer 23 can be used. For the first magnetic layer 21, the same material as aforementioned material for the first magnetic layer 21 can be used. For each of the second magnetic layer 22 and the third magnetic layer 24, the same material as aforementioned material for the second magnetic layer 22 can be used.

The cap layer 70 (see FIG. 4) protects a layer provided below the cap layer 70. For the cap layer 70, for example, a plurality of metal layers are used. For the cap layer 70, for example, a two-layer structure of a Ta layer and a Ru layer (Ta/Ru) is used. The thickness of the Ta layer is, for example, 1 nm, and the thickness of the Ru layer is, for example, 5 nm. As the cap layer 70, instead of the Ta layer or the Ru layer, another metal layer may be provided. The configuration of the cap layer 70 is arbitrary. For example, for the cap layer 70, a nonmagnetic material can be used. Other materials may be used for the cap layer 70, as long as it may protect the layer provided below the cap layer 70.

When a magnetic material containing boron is used for the magnetization free layer 20, in order to prevent diffusion of the boron, a diffusion prevention layer of an oxide material or a nitride material may be provided between the magnetization free layer 20 and the cap layer 70. As the result of using the diffusion prevention layer including an oxide layer or a nitride layer, the diffusion of boron contained in the magnetization free layer 20 can be suppressed to maintain the amorphous structure of the magnetization free layer 20. As the oxide materials and the nitride materials used for the diffusion prevention layer, specifically, oxide materials and nitride materials containing such element as Mg, Al, Si, Ti, V, Cr, Mn, Fe, Co, Ni, Cu, Zn, Zr, Nb, Mo, Ru, Rh, Pd, Ag, Hf, Ta, W, Sn, Cd or Ga can be used. Here, since the diffusion prevention layer is a layer that does not contribute to the magnetoresistance effect, lower areal resistance thereof is favorable. For example, the areal resistance of the diffusion prevention layer is set favorably to be lower than the areal resistance of the spacer layer 30 that contributes to the magnetoresistance effect. From the viewpoint of lowering the areal resistance of the diffusion prevention layer, an oxide or a nitride of Mg, Ti, V, Zn, Sn, Cd or Ga having a low barrier height is favorable. From the viewpoint of the function of suppressing the diffusion of boron, an oxide having a stronger chemical bond is favorable. For example, MgO of 2.0 nm can be used.

When the oxide material or nitride material is used for the diffusion prevention layer, the thickness of the diffusion prevention layer is favorably not less than 0.5 nm from the viewpoint of sufficiently exerting the function of preventing the diffusion of boron, and is favorably not more than 5 nm from the viewpoint of lowering the areal resistance. That is, the thickness of the diffusion prevention layer is favorably not less than 0.5 nm but not more than 5 nm, preferably not less than 1 nm but not more than 3 nm.

For the diffusion prevention layer, at least one selected from the group consisting of magnesium (Mg), silicon (Si) and aluminum (Al) can be used. For the diffusion prevention layer, a material containing any of these light elements can be used. These light elements are bonded with boron to generate a compound. In the part including the interface between the diffusion prevention layer and the magnetization free layer 20, for example, at least one of an Mg—B compound, an Al—B compound and an Si—B compound is formed. These compounds suppress the diffusion of the boron.

Between the diffusion prevention layer and the magnetization free layer 20, another metal layer or the like may have been interposed. However, when the distance between the diffusion prevention layer and the magnetization free layer 20 is too large, the boron diffuses between these layers to lower the boron concentration in the magnetization free layer 20. Therefore, the distance between the diffusion prevention layer and the magnetization free layer 20 is favorably not more than 10 nm, preferably not more than 3 nm.

Figure 7:
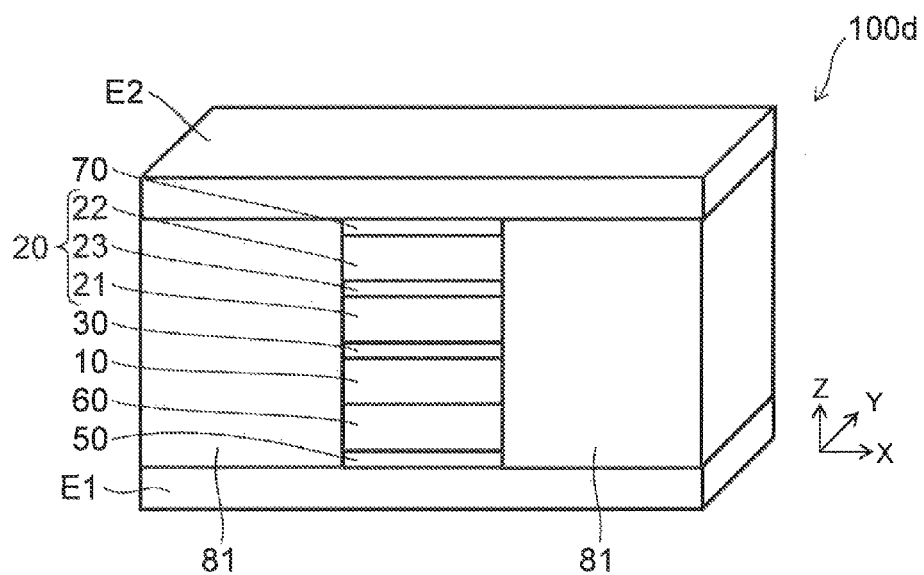
FIG. 7 is a schematic perspective view illustrating another example of the strain sensing element according to the embodiment.

FIG. 7 is a schematic perspective view illustrating another example of the strain sensing element according to the embodiment.

As illustrated in FIG. 7, in a strain sensing element 100d, an insulating layer 81 is provided. That is, between the first electrode E1 and the second electrode E2, two insulating layers 81 (insulating part) separated from each other are provided, and, between these layers, a stacked body is disposed. The stacked body is disposed between the first electrode E1 and the second electrode E2. In the case of the strain sensing element 100d, the stacked body includes the under layer 50, the pinning layer 60, the reference layer 10, the spacer layer 30, the magnetization free layer 20 and the cap layer 70. The magnetization free layer 20 includes the first magnetic layer 21, the magnetic coupling layer 23, and the second magnetic layer 22. That is, while facing a side wall of the stacked body, the insulating layer 81 is provided.

For the insulating layer 81, for example, an aluminum oxide (such as $Al_2O_3$), a silicon oxide (such as $SiO_2$), or the like can be used. By the insulating layer 81, a leak current in the circumference of the stacked body can be suppressed.

Figure 8:
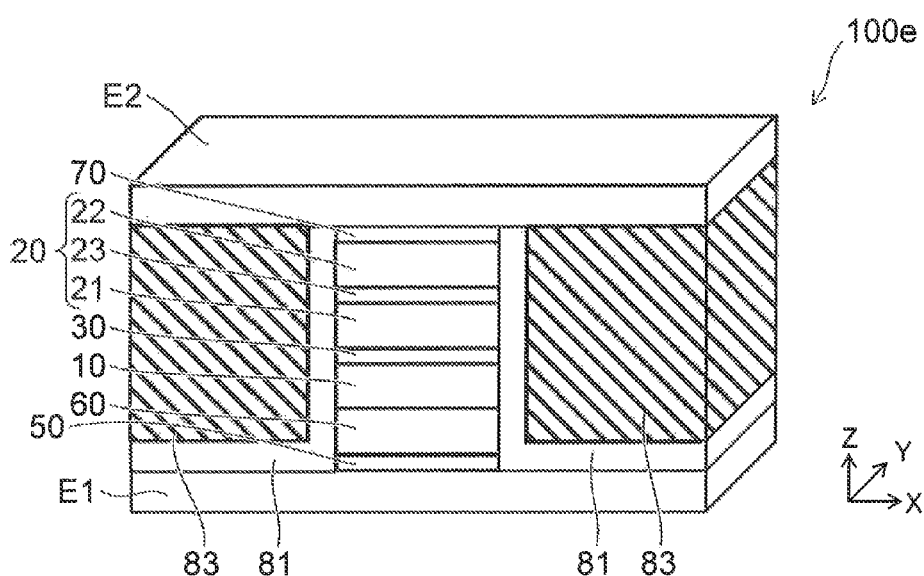
FIG. 8 is a schematic perspective view illustrating another example of the strain sensing element according to the embodiment.

FIG. 8 is a schematic perspective view illustrating another example of the strain sensing element according to the embodiment.

As illustrated in FIG. 8, in a strain sensing element 100e, a hard bias layer 83 is further provided. That is, between the first electrode E1 and the second electrode E2, two hard bias layers 83 (hard bias part) separated from each other are provided, and the stacked body is disposed therebetween. Further, between the hard bias layer 83 and the stacked body, the insulating layer 81 is disposed. Furthermore, in the example, between the hard bias layer 83 and the first electrode E1, the insulating layer 81 extends.

The hard bias layer 83 causes at least one of the magnetization 21m of the first magnetic layer 21 and the magnetization 22m of the second magnetic layer 22 to be set in an intended direction by the magnetization of the hard bias layer 83. By the hard bias layer 83, in the state where no force is applied to the substrate 210, at least one of the magnetization 21m of the first magnetic layer 21 and the magnetization 22m of the second magnetic layer 22 can be set in an intended direction.

For the hard bias layer 83, for example, a hard ferromagnetic material having relatively high magnetic anisotropy such as CoPt, CoCrPt or FePt is used. For the hard bias layer 83, a structure, in which a layer of a soft magnetic material such as FeCo or Fe and an antiferromagnetic layer are stacked, can be used. In this case, the magnetization is generated along a predetermined direction by an exchange coupling. The thickness of the hard bias layer 83 (the length along the direction from the first electrode E1 toward the second electrode E2) is, for example, not less than 5 nm but not more than 50 nm.

The hard bias layer 83 and the insulating layer 81 can be applied to any of strain sensing elements to be described later.

Working Example 1

As Working example 1 according to the embodiment, a strain sensing element having a structure below is fabricated.

Under layer 50: Ta (1 nm)/Ru (2 nm)
Pinning layer 60: $Ir_{22}Mn_{78}$ (7 nm)
Second magnetization pinned layer 12: $Co_{75}Fe_{25}$ (2.5 nm)
Magnetic coupling layer 13: Ru (0.9 nm)
First magnetization pinned layer 11: $Co_{40}Fe_{40}B_{20}$ (3 nm)
Spacer layer 30: MgO (2 nm)
Magnetization free layer 20: $Co_{40}Fe_{40}B_{20}$ (4 nm)/Ru (0.9 nm)/$Co_{40}Fe_{40}B_{20}$ (2 nm)
Diffusion prevention layer: MgO (1.8 nm)
Cap layer 70: Cu (1 nm)/Ta (2 nm)/Ru (5 nm)

In a first Working example, as the magnetization free layer 20, $Co_{40}Fe_{40}B_{20}$ (4 nm)/Ru (0.9 nm)/$Co_{40}Fe_{40}B_{20}$ (2 nm) is used. As to the element size of a vertically conducting element, two kinds of 20 μm×20 μm and 6 μm×6 μm are fabricated.

FIGS. 9A to 9D show results of strain sensor characteristics of strain sensing elements in the first Working example and in a first Comparative example.

The evaluation of strain sensor characteristics shown in FIGS. 9A to 9D is performed by a substrate bending method. For a wafer (strip wafer) obtained by cutting a wafer of a strain sensing element fabricated into a strip shape by way of trial, strain is applied by a four-point bending method with a knife edge. In the knife edge that bends the strip wafer, a load cell is incorporated and, from a load measured with the load cell, the strain applied to the strain sensing element on the wafer surface is calculated. For the calculation of the strain, a general theoretical formula of a two-side-supported beam represented by a formula below is used.

[Formula 1]

$$\varepsilon = -\frac{3(L_1 - L_2)G}{2Wt^2 e_s} \quad \text{Formula (1)}$$

Here, $e_s$ represents the Young's modulus of the wafer. $L_1$ represents the length between knife edges of an outside knife. $L_2$ represents the length between knife edges of an inside knife. W represents the width of the strip wafer. t represents the thickness of the strip wafer. G represents the load applied to the knife edge. Here, it is so configured that the load applied to the knife edge can be changed continuously by motor control.

As to the direction of strain application, it is applied in the direction vertical to the magnetization direction of the first magnetization pinned layer 11 in the same plane. In the specification of the application, the strain of a positive value is tensile strain, and the strain of a negative value is compression strain.

Figure 9A:
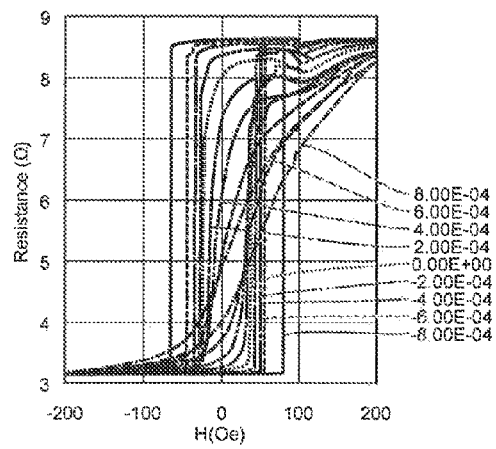
FIGS. 9A to 9D show results of strain sensor characteristics of strain sensing elements in the first Working example and in a first Comparative example.

FIG. 9A shows results of measuring the dependence of electric resistance on a magnetic field, while setting strains applied to the strain sensing element from −0.8 (‰) up to 0.8 (‰) at intervals of 0.2 (‰) as fixed values, at respective strains for the strain sensing element in the first Working example having an element size of 20 μm×20 μm. FIG. 9C shows results of measuring the dependence of electric resistance on a magnetic field, while setting strains applied to the strain sensing element from −0.8 (‰) up to 0.8 (‰) at intervals of 0.2 (‰) as fixed values, at respective strains for the strain sensing element in the first Working example having an element size of 6 μm×6 μm.

As to the external magnetic field direction in the measurement, the external magnetic field is applied in the direction parallel to the first magnetization pinned layer 11 in the plane, and a positive external magnetic field corresponds to the case where the magnetic field was applied in the opposite side to the magnetization of the first magnetization pinned layer 11. In both FIGS. 9A and 9C, it is known that an R-H loop shape changes depending on values of applied strain. This shows that the in-plane magnetic anisotropy of the magnetization free layer 20 changes by the inverse magnetostrictive effect.

Figure 9B:
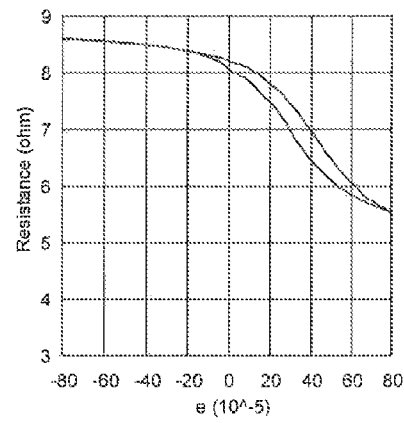
Figure 9C:
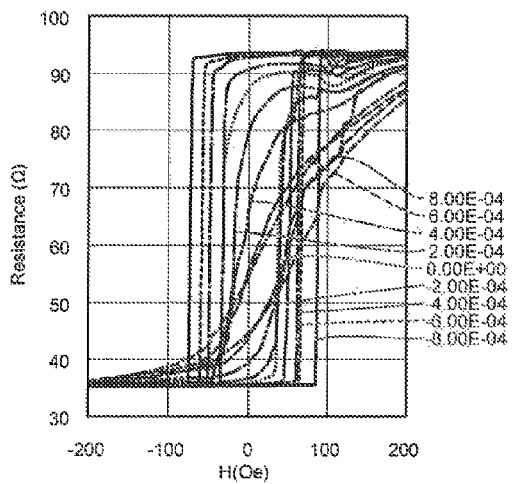
Figure 9D:
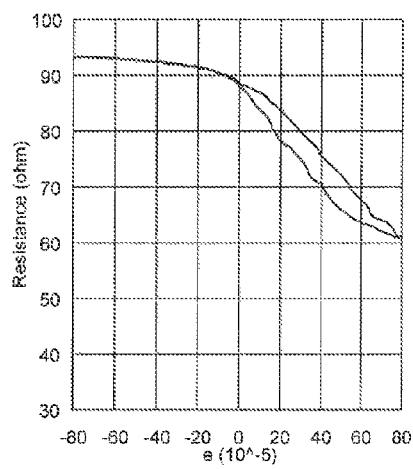

FIG. 9B shows the change in electric resistance in the case where the strain was varied continuously from −0.8 (‰) up to 0.8 (‰) for the strain sensing element in the first Working example having an element size of 20 μm×20 μm while fixing the external magnetic field. FIG. 9D shows change in electric resistance in the case where the strain was varied continuously from −0.8 (‰) up to 0.8 (‰) for the strain sensing element in the first Working example having an element size of 6 μm×6 μm while fixing the external magnetic field.

The strain is varied from −0.8 (‰) toward 0.8 (‰) and, subsequently, from 0.8 (‰) toward −0.8 (‰). These results show strain sensor characteristics. Referring to FIGS. 9B and 9D, from the change in electric resistance relative to the strain in the first Working example and the first Comparative example, the gauge factor is estimated.

The gauge factor is represented by a formula below.

$$GF=(dR/R)/d\varepsilon \quad \text{Formula (2)}$$

From FIG. 9B, it was found that the gauge factor of 20 μm×20 μm in the first Working example was 841. From FIG. 9D, it was known that the gauge factor of 6 μm×6 μm in the first Working example was 770. It was found that a high gauge factor can be actualized without depending on an element size, as the result of using the magnetization free layers 20 of a synthetic type, coupled anti-parallel to each other via the magnetic coupling layer 23 for the magnetization free layer 20 as in the first Working example.

Figure 10:
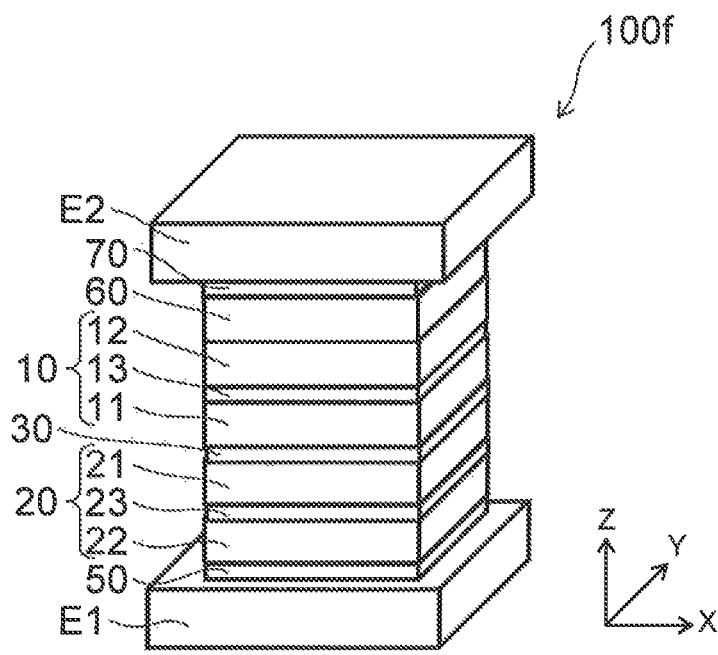
FIG. 10 is a schematic perspective view showing another example of the strain sensing element according to the embodiment.

FIG. 10 is a schematic perspective view showing another example of the strain sensing element according to the embodiment.

As shown in FIG. 10, a strain sensing element 100f used for the pressure sensor 200 according to the embodiment includes the first electrode E1, the under layer 50, the magnetization free layer 20, the spacer layer 30, the reference layer 10, the pinning layer 60, the cap layer 70, and the second electrode E2. The reference layer 10 includes the first magnetization pinned layer 11, the second magnetization pinned layer 12, and the magnetic coupling layer 13. The magnetization free layer 20 includes the second magnetic layer 22, the magnetic coupling layer 23, and the first magnetic layer 21.

Between the first electrode E1 and the second electrode E2, the under layer 50 is provided. Between the under layer 50 and the second electrode E2, the second magnetic layer 22 is provided. Between the second magnetic layer 22 and the second electrode E2, the magnetic coupling layer 23 is provided. Between the magnetic coupling layer 23 and the second electrode E2, the first magnetic layer 21 is provided. Between the first magnetic layer 21 and the second electrode E2, the spacer layer 30 is provided. Between the spacer layer 30 and the second electrode E2, the first magnetization pinned layer 11 is provided. Between the first magnetization pinned layer 11 and the second electrode E2, the magnetic coupling layer 13 is provided. Between the magnetic coupling layer 13 and the second electrode E2, the second magnetization pinned layer 12 is provided. Between the second magnetization pinned layer 12 and the second electrode E2, the pinning layer 60 is provided. Between the pinning layer 60 and the second electrode E2, the cap layer 70 is provided.

In the example, the first magnetization pinned layer 11 corresponds to the reference layer 10. The strain sensing element 100f is of a top spin-valve type.

For the under layer 50, for example, Ta/Cu is used. The thickness of the Ta layer is, for example, 3 nm. The thickness of the Ru layer is, for example, 5 nm.

For the magnetization free layer 20, for example, $Co_{40}Fe_{40}B_{20}$ (2 nm)/Ru (0.9 nm)/$Co_{40}Fe_{40}B_{20}$ (4 nm) is used. For the spacer layer 30, for example, an MgO layer of 2.0 nm in thickness is used.

Here, between the under layer 50 and the magnetization free layer 20, a diffusion prevention layer not shown may be provided. For the diffusion prevention layer, for example, MgO of 2.0 nm can be used.

For the first magnetization pinned layer 11, for example, $Co_{40}Fe_{40}B_{20}/Fe_{50}Co_{50}$ is used. The thickness of the $Co_{40}Fe_{40}B_{20}$ layer is, for example, 2 nm. The thickness of the $Fe_{50}Co_{50}$ layer is, for example, 1 nm.

For the magnetic coupling layer 13, for example, a Ru layer of 0.9 nm in thickness is used.

For the second magnetization pinned layer 12, for example, a $Co_{75}Fe_{25}$ layer of 2.5 nm in thickness is used. For the pinning layer 60, for example, an IrMn layer of 7 nm in thickness is used.

For the cap layer 70, Ta/Ru is used. The thickness of the Ta layer is, for example, 1 nm. The thickness of the Ru layer is, for example, 5 nm.

For each of layers included in the strain sensing element 100f, for example, the material described in relation to the strain sensing element 100a can be used.

Figure 11:
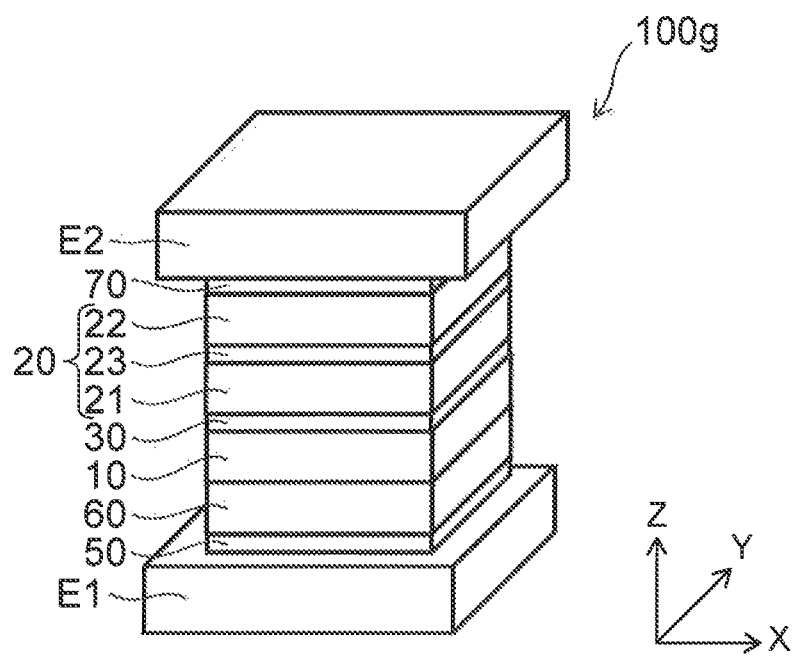
FIG. 11 is a schematic perspective view showing another example of the strain sensing element according to the embodiment.

FIG. 11 is a schematic perspective view showing another example of the strain sensing element according to the embodiment.

As shown in FIG. 11, a strain sensing element 100g used for the pressure sensor 200 according to the embodiment includes the first electrode E1, the under layer 50, the pinning layer 60, the reference layer 10, the spacer layer 30, the magnetization free layer 20, the cap layer 70, and the second electrode E2. The magnetization free layer 20 includes the first magnetic layer 21, the magnetic coupling layer 23, and the second magnetic layer 22.

Between the first electrode E1 and second electrode E2, the under layer 50 is provided. Between the under layer 50 and the second electrode E2, the pinning layer 60 is provided. Between the pinning layer 60 and the second electrode E2, the reference layer 10 is provided. Between the reference layer 10 and the second electrode E2, the spacer layer 30 is provided. Between the spacer layer 30 and the second electrode E2, the first magnetic layer 21 is provided. Between the first magnetic layer 21 and the second electrode E2, the magnetic coupling layer 23 is provided. Between the magnetic coupling layer 23 and the second electrode E2, the second magnetic layer 22 is provided. Between the second magnetic layer 22 and the second electrode E2, the cap layer 70 is provided.

To the strain sensing element having been described previously, the structure using the second magnetization pinned layer 12, the magnetic coupling layer 13 and the first magnetization pinned layer 22 is applied. To the strain sensing element 100g of the embodiment, the single pin structure using a single magnetization pinned layer is applied.

For the under layer 50, for example, Ta/Ru is used. The thickness of the Ta layer is, for example, 3 nm. The thickness of the Ru layer is, for example, 2 nm.

For the pinning layer 60, for example, an IrMn layer of 7 nm in thickness is used.

For the reference layer 10, for example, a $Co_{40}Fe_{40}B_{20}$ layer of 3 nm in thickness is used.

For the spacer layer 30, for example, an MgO layer of 2.0 nm in thickness is used.

For the magnetization free layer 20, for example, $Co_{40}Fe_{40}B_{20}$ (4 nm)/Ru (0.9 nm)/$Co_{40}Fe_{40}B_{20}$ (2 nm) is used.

For the cap layer 70, Ta/Ru is used. The thickness of the Ta layer is, for example, 1 nm. The thickness of the Ru layer is, for example, 5 nm.

Here, between the magnetization free layer 20 and the cap layer 70, a diffusion prevention layer not shown may be provided. For the diffusion prevention layer, for example, MgO of 2.0 nm can be used.

For each of layers included in the strain sensing element 100g, for example, the material described in relation to the strain sensing element 100a in the embodiment can be used.

Figure 12:
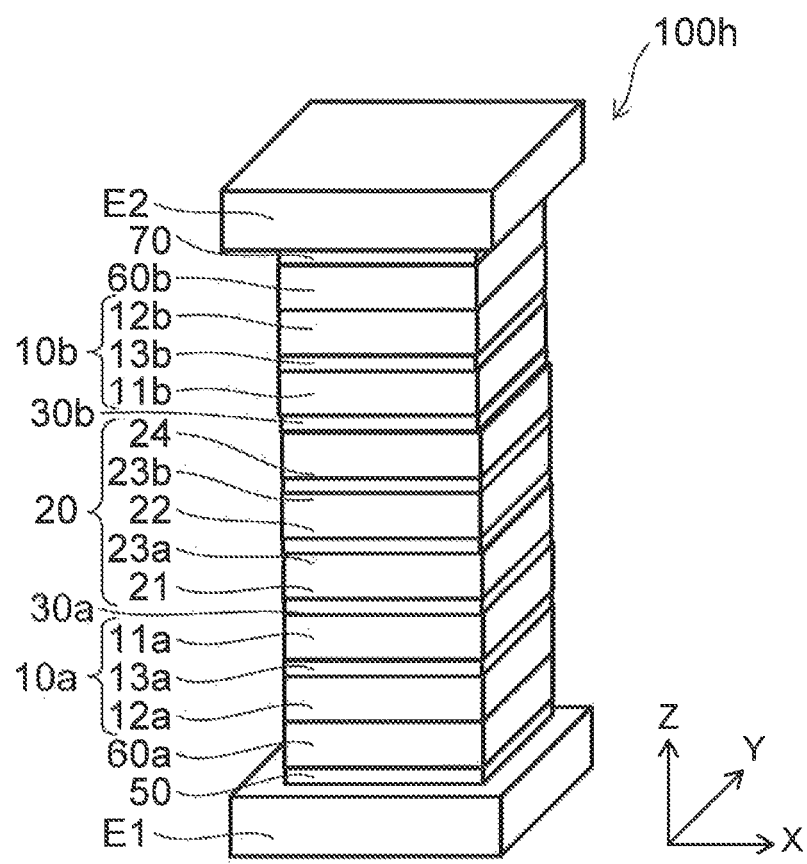
FIG. 12 is a schematic perspective view showing another example of the strain sensing element according to the embodiment.

FIG. 12 is a schematic perspective view showing another example of the strain sensing element according to the embodiment.

As shown in FIG. 12, a strain sensing element 100h used for the pressure sensor 200 according to the embodiment includes the first electrode E1, the under layer 50, a first pinning layer 60a, a first reference layer 10a, a first spacer layer 30a, the magnetization free layer 20, a second spacer layer 30b, a second reference layer 10b, a second pinning layer 60b, the cap layer 70, and the second electrode E2. The first reference layer 10a includes a second magnetization pinned layer 12a, a first magnetization pinned layer 11a, and a magnetic coupling layer 13a. The second reference layer 10b includes a first magnetization pinned layer 11b, a second magnetization pinned layer 12b, and a magnetic coupling layer 13b. The magnetization free layer 20 includes the first magnetic layer 21, the first magnetic coupling layer 23a, the second magnetic layer 22, the second magnetic coupling layer 23b, and the third magnetic layer 24.

Between the first electrode E1 and the second electrode E2, the under layer 50 is provided. Between the under layer 50 and the second electrode E2, the first pinning layer 60a is provided. Between the first pinning layer 60a and the second electrode E2, the second magnetization pinned layer 12a is provided. Between the second magnetization pinned layer 12a and the second electrode E2, the magnetic coupling layer 13a is provided. Between the magnetic coupling layer 13a and the second electrode E2, the first magnetization pinned layer 11a is provided. Between the first magnetization pinned layer 11a and the second electrode E2, the first spacer layer 30a is provided. Between the first spacer layer 30a and the second electrode E2, the first magnetic layer 21 is provided. Between the first magnetic layer 21 and the second electrode E2, the first magnetic coupling layer 23a is provided. Between the first magnetic coupling layer 23a and the second electrode E2, the second magnetic layer 22 is provided. Between the second magnetic layer 22 and the second electrode E2, the second magnetic coupling layer 23b is provided. Between the second magnetic coupling layer 23b and the second electrode E2, the third magnetic layer 24 is provided. Between the third magnetic layer 24 and the second electrode E2, the second spacer layer 30b is provided. Between the second spacer layer 30b and the second electrode E2, the first magnetization pinned layer 11b is provided. Between the first magnetization pinned layer 11b and the second electrode E2, the magnetic coupling layer 13b is provided. Between the magnetic coupling layer 13b and the second electrode E2, the second magnetization pinned layer 12b is provided. Between the second magnetization pinned layer 12b and the second electrode E2, the second pinning layer 60b is provided. Between the second pinning layer 60b and the second electrode E2, the cap layer 70 is provided.

In the example, the strain sensing element 100h is of a dual spin-valve type. When the dual spin-valve type as shown in FIG. 12 is used, the number of magnetic layers coupled anti-parallel with one another included in the magnetization free layer 20 is favorably set to be an odd number. The reason is that, by setting magnetization directions of magnetic layers disposed near the spacer layer to be the same, they are set to be the same as the magnetization alignment of the magnetization free layer 20, the first magnetization pinned layer 11a and the first magnetization pinned layer 11b and the change in the electric resistance can be made even in the same way. When magnetization directions of the first magnetization pinned layer 11a and the first magnetization pinned layer 11b are made anti-parallel to each other by shifting the number of layers of the magnetization pinned layer, the number of magnetic layers included in the magnetization free layer 20 is favorably set to be an even number.

For the under layer 50, for example, Ta/Ru is used. The thickness of the Ta layer is, for example, 3 nm. The thickness of the Ru layer is, for example, 5 nm.

For the first pinning layer 60a, for example, an IrMn layer of 7 nm in thickness is used.

For the second magnetization pinned layer 12a of the first reference layer 10a, for example, a $Co_{75}Fe_{25}$ layer of 2.5 nm in thickness is used.

For the magnetic coupling layer 13a of the first reference layer 10a, for example, a Ru layer of 0.9 nm in thickness is used.

For the first magnetization pinned layer 11a of the first reference layer 10a, for example, $Co_{40}Fe_{40}B_{20}$ (3 nm) is used.

For the first spacer layer 30a, for example, an MgO layer of 2.0 nm in thickness is used.

For the magnetization free layer 20, for example, $Co_{40}Fe_{40}B_{20}$ (2 nm)/Ru (0.9 nm)/$Co_{40}Fe_{40}B_{20}$ (4 nm)/Ru (0.9 nm)/$Co_{40}Fe_{40}B_{20}$ (2 nm) is used.

For the second spacer layer 30b, for example, an MgO layer of 2.0 nm in thickness is used.

For the first magnetization pinned layer 11b of the second reference layer 10b, for example, $Co_{40}Fe_{40}B_{20}$/$Fe_{50}Co_{50}$ is used. The thickness of the $Co_{40}Fe_{40}B_{20}$ layer is, for example, 2 nm. The thickness of the $Fe_{50}Co_{50}$ layer is, for example, 1 nm.

For the magnetic coupling layer 13b of the second reference layer 10b, for example, a Ru layer of 0.9 nm in thickness is used.

For the second magnetization pinned layer 12b of the second reference layer 10b, for example, a $Co_{75}Fe_{25}$ layer of 2.5 nm in thickness is used.

For the second pinning layer 60b, for example, an IrMn layer of 7 nm in thickness is used.

For the cap layer 70, Ta/Ru is used. The thickness of the Ta layer is, for example, 1 nm. The thickness of the Ru layer is, for example, 5 nm.

For each of layers included in the strain sensing element 100h, for example, the materials described in relation to the strain sensing element 100a can be used.

Figure 13:
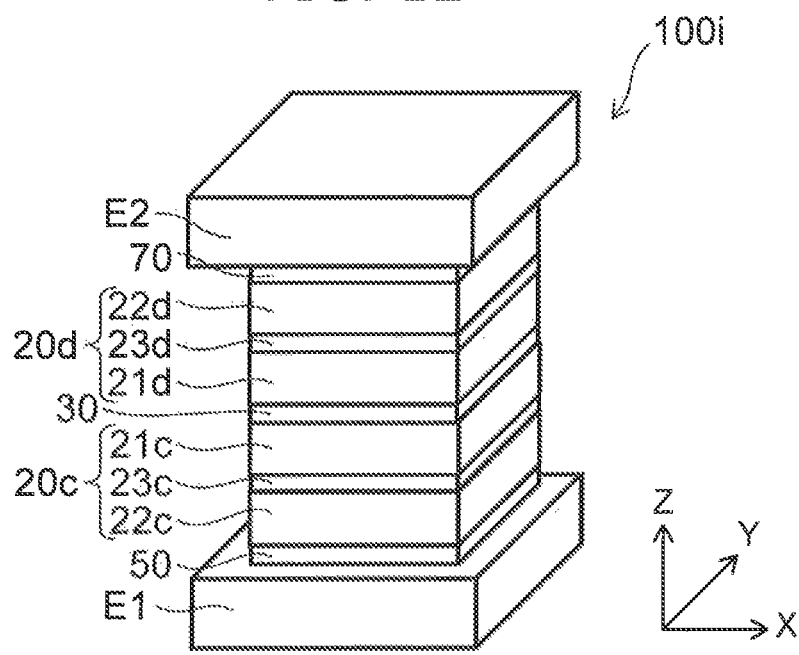
FIG. 13 is a schematic perspective view showing another example of the strain sensing element according to the embodiment.

FIG. 13 is a schematic perspective view showing another example of the strain sensing element according to the embodiment.

As shown in FIG. 13, a strain sensing element 100i used for the pressure sensor 200 according to the embodiment includes the first electrode E1, the under layer 50, a first magnetization free layer 20c, the spacer layer 30, a second magnetization free layer 20d, the cap layer 70, and the second electrode E2. The first magnetization free layer 20c includes a second magnetic layer 22c, a first magnetic coupling layer 23c, and a first magnetic layer 21c. The second magnetization free layer 20d includes a first magnetic layer 21d, a second magnetic coupling layer 23d, and a second magnetic layer 22d.

Between the first electrode E1 and the second electrode E2, the under layer 50 is provided. Between the under layer 50 and the second electrode E2, the second magnetic layer 22c is provided. Between the second magnetic layer 22c and the second electrode E2, the first magnetic coupling layer 23c is provided. Between the first magnetic coupling layer 23c and the second electrode E2, the first magnetic layer 21c is provided. Between the first magnetic layer 21c and the second electrode E2, the spacer layer 30 is provided. Between the spacer layer 30 and the second electrode E2, the first magnetic layer 21d is provided. Between the first magnetic layer 21d and the second electrode E2, the second magnetic coupling layer 23d is provided. Between the second magnetic coupling layer 23d and the second electrode E2, the second magnetic layer 22d is provided. Between the second magnetic layer 22d and the second electrode E2, the cap layer 70 is provided.

The strain sensing element 100i used for the embodiment is a strain sensing element of a two-layer free type having two free layers.

For the under layer 50, for example, Ta/Ru is used. The thickness of the Ta layer is, for example, 3 nm. The thickness of the Ru layer is, for example, 2 nm.

For the first magnetization free layer 20c, for example, $Co_{40}Fe_{40}B_{20}$ (2 nm)/Ru (0.9 nm)/$Co_{40}Fe_{40}B_{20}$ (4 nm) is used.

For the spacer layer 30, for example, an MgO layer of 2.0 nm in thickness is used.

For the second magnetization free layer 20d, for example, $Co_{40}Fe_{40}B_{20}$ (4 nm)/Ru (0.9 nm)/$Co_{40}Fe_{40}B_{20}$ (2 nm) is used.

For the cap layer 70, Ta/Ru is used. The thickness of the Ta layer is, for example, 1 nm. The thickness of the Ru layer is, for example, 5 nm.

Between the under layer 50 and the first magnetization free layer 20c, a diffusion prevention layer may be provided. As the diffusion prevention layer, for example, an MgO layer of 2.0 nm in thickness can be used. Between the second magnetization free layer 20d and the cap layer 70, a diffusion prevention layer may be provided. As the diffusion prevention layer, for example, an MgO layer of 2.0 nm in thickness can be used.

For each of layers included in the strain sensing element 100i of the embodiment, for example, the materials described in relation to the strain sensing element 100a of the embodiment can be used.

When a stacked structure of the first magnetization free layer 20c, the spacer layer 30 and the second magnetization free layer 20d is used as in the above-mentioned strain sensing element, too, the relative angle between the magnetization of the first magnetization free layer 20c and the magnetization of the second magnetization free layer 20d changes for strain. Consequently, it can function as a strain sensor. In this case, it is possible to design so that the value of magnetostriction of the first magnetization free layer 20c and the value of magnetostriction of the second magnetization free layer 20d differ from each other. Consequently, the relative angle between the magnetization of the first magnetization free layer 20c and the magnetization of the second magnetization free layer 20d changes for strain.

Second Embodiment

Figure 14:
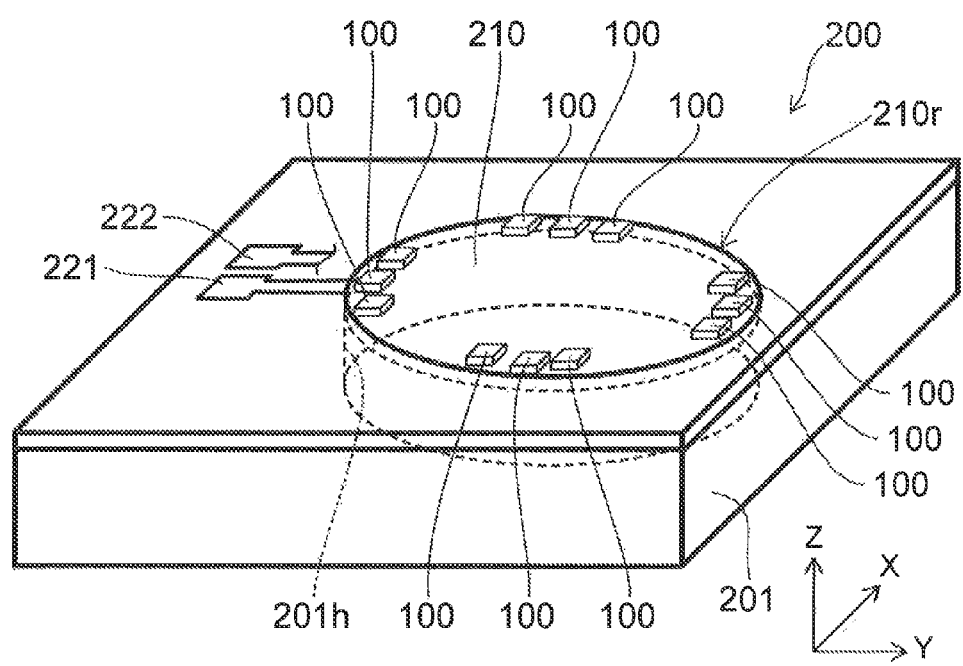
FIG. 14 is a schematic perspective view illustrating a pressure sensor according to a second embodiment.

FIG. 14 is a schematic perspective view illustrating a pressure sensor according to a second embodiment.

Figure 15A:
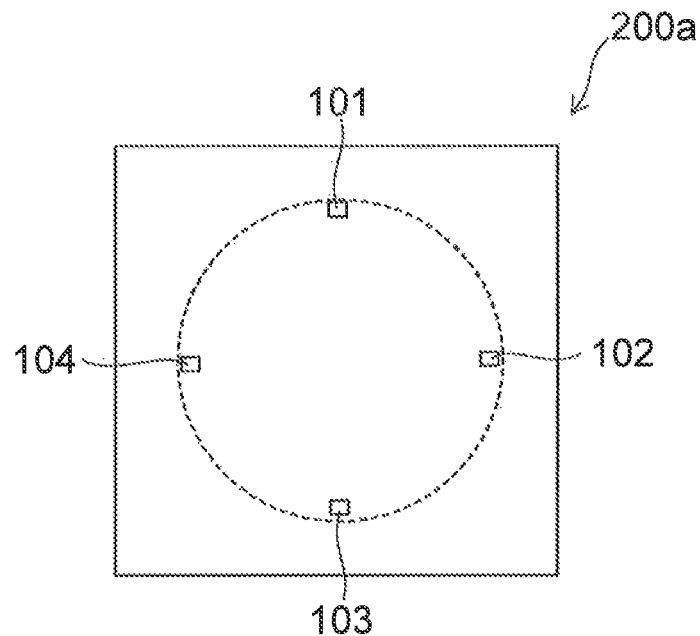
FIGS. 15A and 15B are schematic views illustrating another example of the pressure sensor according to the embodiment.
Figure 15B:
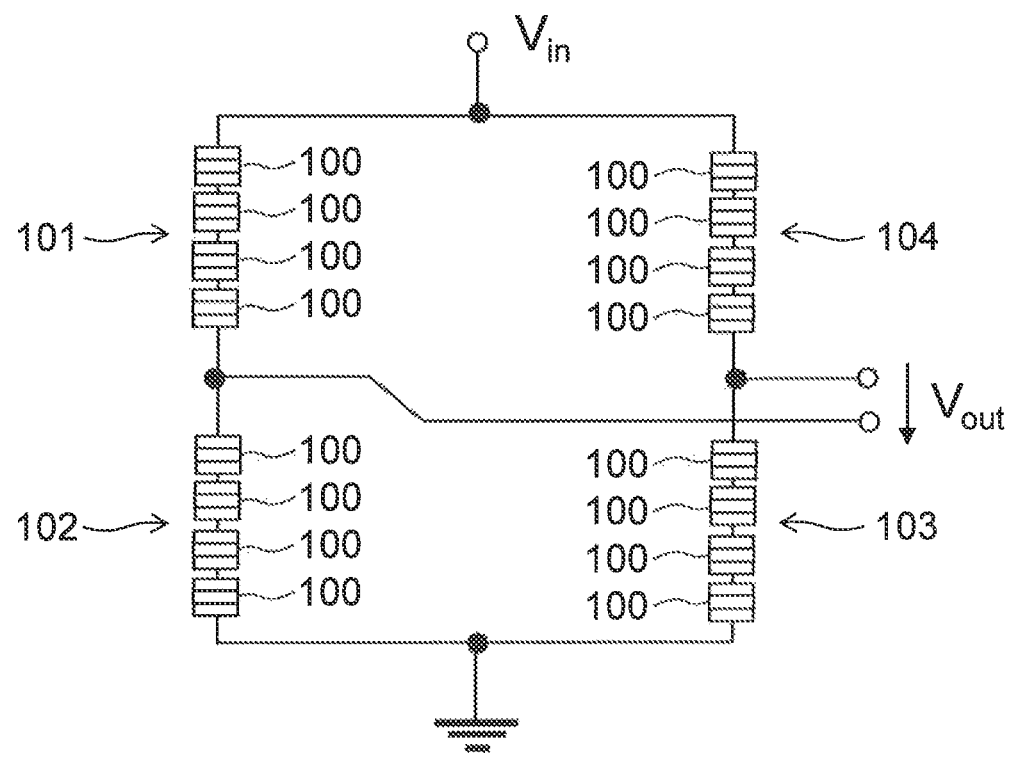

FIGS. 15A and 15B are schematic views illustrating another example of the pressure sensor according to the embodiment.

As shown in FIG. 14, the pressure sensor 200 according to the embodiment includes a supporting part 201, the substrate 210, and the strain sensing element 100. The pressure sensor 200 according to the embodiment may include, in place of the strain sensing element 100 according to the embodiment, any of strain sensing elements 100a, 100b, 100c, 100d, 100e, 100f, 100g, 100h and 100i according to the embodiment.

The substrate 210 is supported by the supporting part 201. The substrate 210 has, for example, a flexible region. The substrate 210 is, for example, a diaphragm. The substrate 210 may be supported with the supporting part 201, or may be a separate body. For the substrate 210, a material same as the material of the supporting part 201 may be used, or a material different from the material of the supporting part 201 may be used. A part of the supporting part 201 may be removed so that a part having a small thickness in the supporting part 201 serves as the substrate 210.

The thickness of the substrate 210 is smaller than the thickness of the supporting part 201. When the same material is used for the substrate 210 and the supporting part 201, and these are formed integrally, a part having a small thickness serves as the substrate 210 and a part having a large thickness serves as the supporting part 201.

The supporting part 201 may have a through hole 201h passing through the supporting part 201 in the thickness direction, and the substrate 210 may be provided so as to cover the through hole 201h. At this time, for example, a film of a material to form the substrate 210 may extend also on a part other than the through hole 201h of the supporting part 201. At this time, out of the film of the material to form the substrate 210, a part overlapping the through hole 201h serves as the substrate 210.

The substrate 210 has an outer edge 210r. In the case where the same material is used for the substrate 210 and the supporting part 201, and these are integrated, the outer edge of a part having a small thickness forms the outer edge 210r of the substrate 210. In the case where the supporting part 201 has a through hole 201h passing through the supporting part 201 in the thickness direction and the substrate 210 is provided so as to cover the through hole 201h, out of the film of a material serving as the substrate 210, the outer edge of the part overlapping the through hole 201h serves as the outer edge 210r of the substrate 210.

The supporting part 201 may support continuously the outer edge 210r of the substrate 210, or may support a part of the outer edge 210r of the substrate 210.

The strain sensing element 100 is provided on the substrate 210. For example, the strain sensing element 100 is provided on a part of the substrate 210. In the example, a plurality of strain sensing elements 100 are provided on the substrate 210. The number of the strain sensing elements to be provided on a film part may be one.

In the pressure sensor 200 shown in FIG. 14, a first wiring 221 and a second wiring 222 are provided. The first wiring 221 is connected to the strain sensing element 100. The second wiring 222 is connected to the strain sensing element 100. For example, between the first wiring 221 and the second wiring 222, an interlayer insulating film is provided, and the first wiring 221 and the second wiring 222 are insulated electrically from each other. A voltage is applied between the first wiring 221 and the second wiring 222, and the voltage is applied to the strain sensing element 100 via the first wiring 221 and the second wiring 222. When pressure is applied to the pressure sensor 200, the substrate 210 deforms. In the strain sensing element 100, with the deformation of the substrate 210, electric resistance R changes. By detecting the change in the electric resistance R via the first wiring 221 and the second wiring 222, the pressure can be detected.

For the supporting part 201, for example, a plate-shaped substrate can be used. In the inside of the substrate, for example, a hollow part (through hole 201h) is provided.

For the supporting part 201, for example, a semiconductor material such as silicon, a conductive material such as metal, or an insulating material can be used. The supporting part 201 may contain, for example, silicon oxide, silicon nitride or the like. The inside of the hollow part (through hole 201h) is, for example, in a depressurized state (vacuum state). In the inside of the hollow part (through hole 201h), a gas such as air, or liquid may be filled. The inside of the hollow part (through hole 201h) is designed so that the substrate 210 can be bent. The inside of the hollow part (through hole 201h) may be connected to the outside air.

On the hollow part (through hole 201h), the substrate 210 is provided. As the substrate 210, for example, a part obtained by processing a part of the supporting part 201 to be thin is used. The thickness (length in the Z-axis direction) of the substrate 210 is smaller than the thickness (length in the Z-axis direction) of the supporting part 201.

When pressure is applied to the substrate 210, the substrate 210 deforms. The pressure corresponds to a pressure that the pressure sensor 200 should detect. The pressure to be applied includes pressure by a sonic wave, ultrasonic wave, or the like. When detecting pressure by a sonic wave, ultrasonic wave or the like, the pressure sensor 200 functions as a microphone.

For the substrate 210, for example, an insulating material is used. The substrate 210 contains, for example, at least one of silicon oxide, silicon nitride and silicon nitride oxide. For the substrate 210, for example, a semiconductor material such as silicon may be used. For the substrate 210, for example, a metal material may be used.

The thickness of the substrate 210 is, for example, not less than 0.1 micrometer (μm) but not more than 3 μm. The thickness is favorably not less than 0.2 μm but not more than 1.5 μm. For the substrate 210, for example, a stacked body of a silicon oxide film of 0.2 μm in thickness and a silicon film of 0.4 μm in thickness may be used.

The strain sensing element 100 may be disposed, as shown in FIG. 14, in plurality on the substrate 210. To obtain the equal change in electric resistance for pressure with a plurality of strain sensing elements 100, as will be described later, can increase an SN ratio by connecting the plurality of strain sensing elements 100 in series and parallel.

In FIG. 14, the strain sensing element 100 is disposed in plurality, but one element may also be sufficient. In FIG. 15A, a variation of disposition on a circular film part is shown.

A pressure sensor 200a shown in FIGS. 15A and 15B includes a first strain sensing element part 101, a second strain sensing element part 102, a third strain sensing element part 103, and a fourth strain sensing element part 104. Each of the first strain sensing element part 101, the second strain sensing element part 102, the third strain sensing element part 103 and the fourth strain sensing element part 104 includes a plurality of strain sensing elements 100. To obtain the equal change in electric resistance R for pressure with the plurality of strain sensing elements 100, as will be described later, can increase an SN ratio by connecting the plurality of strain sensing elements 100 in series and parallel.

For the strain sensing element 100, an extremely small size is sufficient.

Therefore, the area of the strain sensing element 100 can be made sufficiently smaller than the area of the substrate 210 that is bent by pressure. For example, the area of the strain sensing element 100 can be set to be not more than ⅕ of the area of the substrate 210.

For example, when the diameter dimension of the substrate 210 is approximately 60 μm, the dimension of the strain sensing element 100 can be set to be not more than 12 μm. For example, when the diameter dimension of the substrate 210 is approximately 600 μm, the dimension of the strain sensing element 100 can be set to be not more than 120 μm.

In this case, when taking the processing accuracy of the strain sensing element 100 etc. into consideration, it is unnecessary to make the dimensions of the strain sensing element 100 excessively small. Therefore, the dimension of the strain sensing element 100 can be set, for example, to be not less than 0.05 μm but not more than 30 μm.

In FIG. 14, the case where the substrate 210 has a circular planar shape is illustrated, but the planar shape of the substrate 210 is not limited to be circular. The planar shape of the substrate 210 can be set, for example, to be an ellipsoid or a regular polygon such as a regular tetragon or a rectangle.

A plurality of strain sensing elements 100 provided on the substrate 210 can be connected in series. When the number of the strain sensing elements 100 is denoted by N in the case where the plurality of strain sensing elements 100 are connected in series, the number of electric signals to be obtained becomes N times the number obtained in the case where the number of the strain sensing elements 100 is one. On the other hand, thermal noise and Schottky noise become $N^{1/2}$ times. That is, the SN ratio (signal-noise ratio: SNR) becomes $N^{1/2}$ times. As the result of increasing the number N of the strain sensing elements 100 to be connected in series, the SN ratio can be improved without increasing the size of the substrate 210.

A bias voltage applied to one strain sensing element is, for example, not less than 50 millivolt (my) but not more than 150 mV. When N strain sensing elements 100 are connected in series, the bias voltage is not less than 50 mV×N but not more than 150 mV×N. For example, when the number N of the strain sensing elements 100 connected in series is 25, the bias voltage is not less than 1.25 V but not more than 3.75 V.

When the value of the bias voltage is not less than 1 V, it becomes easy to design an electric circuit for processing the electric signal obtained from the strain sensing element 100, which is practically favorable.

The bias voltage (voltage across the terminals) exceeding 10 V is not desired in an electric circuit that processes the electric signal obtained from the strain sensing element 100. In the embodiment, the number N of the strain sensing elements 100 to be connected in series and the bias voltage are set to fall within an appropriate voltage range.

For example, it is favorable that the voltage when a plurality of strain sensing elements 100 are connected electrically in series is not less than 1 V but not more than 10 V. For example, the voltage applied between the terminals (between the terminal at one end and the terminal at the other end) of the plurality of strain sensing elements 100 connected electrically in series is not less than 1 V but not more than 10 V.

In order to generate the voltage, when the bias voltage applied to one strain sensing element 100 is 50 mV, the number N of the strain sensing elements 100 connected in series is favorably not less than 20 but not more than 200.

When the bias voltage applied to one strain sensing element 100 is 150 mV, the number N of the strain sensing elements 100 connected in series is favorably not less than 7 but not more than 66.

At least a part of a plurality of strain sensing elements 100 may be connected electrically in parallel.

As shown in FIG. 15B, a plurality of strain sensing elements 100 may be connected so that the plurality of strain sensing elements 100 form a Wheatstone bridge circuit. Consequently, for example, temperature compensation of detection characteristics can be performed.

Figure 16A:
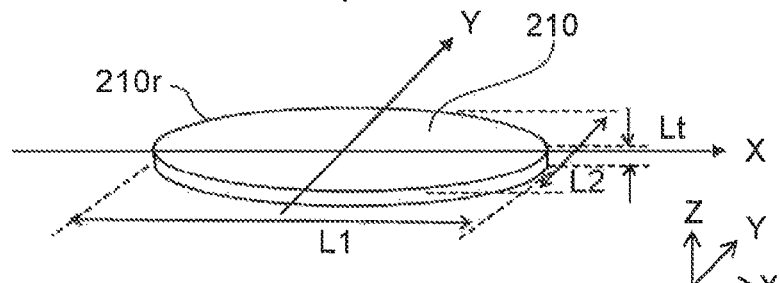
FIGS. 16A to 16C are schematic views explaining the strain generated in the surface of the substrate when pressure is applied to the substrate.
Figure 16B:
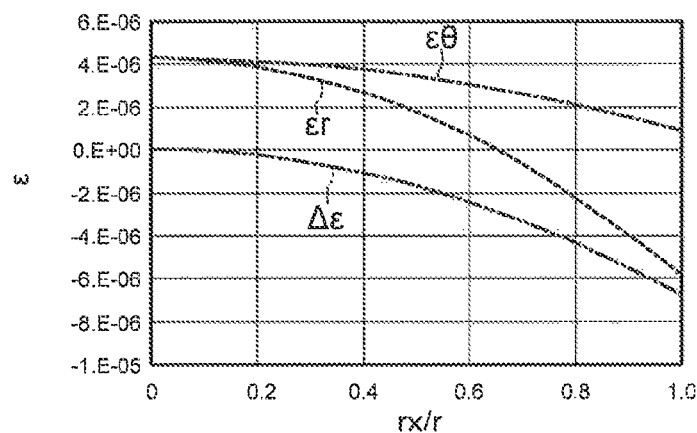
Figure 16C:
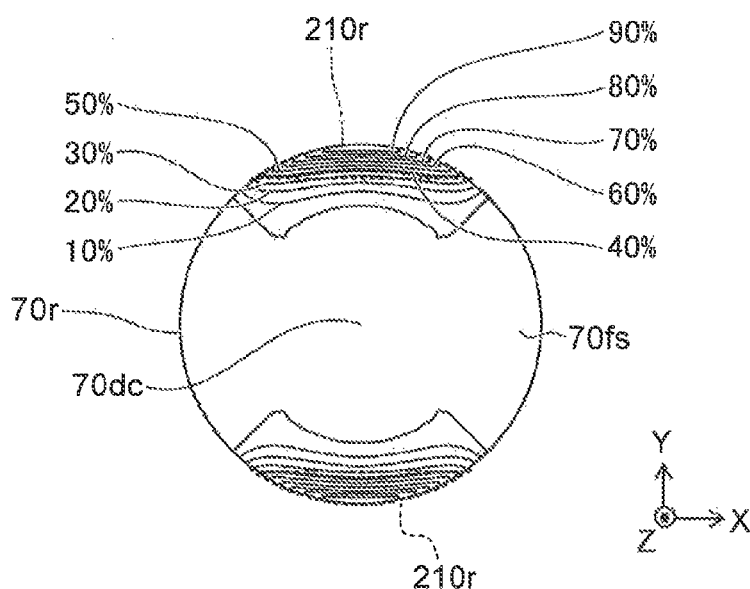

FIGS. 16A to 16C are schematic views explaining the strain generated in the surface of the substrate when pressure is applied to the substrate.

As to the planar shape of the substrate 210, as in the pressure sensor 200 illustrated in FIG. 14, the case of a circle is taken for example and described.

FIGS. 16B and 16C illustrate simulation results of characteristics of the pressure sensor 200.

FIG. 16A is a schematic perspective view of the substrate of the embodiment.

FIG. 16B illustrates strain ϵ generated in the substrate 210 applied with pressure. The ordinate axis in FIG. 16B is strain ϵ (no unit). The abscissa axis in FIG. 16B is a value $r_x/r$ obtained by normalizing the distance from the center by the radius.

In FIG. 16B, the strain ϵ is positive in tensile strain, and the strain ϵ is negative in compression strain. In FIG. 16B, there are shown first strain ϵr being strain in a radius direction, second strain ϵθ being strain in a circumferential direction, and the difference between the first strain ϵr and the second strain ϵθ (anisotropic strain Δϵ=ϵr−ϵθ). The anisotropic strain Δϵ is the difference between the first strain ϵr and the second strain ϵθ. The anisotropic strain Δϵ contributes to the change in the magnetization direction of the magnetization free layer 20 of the strain sensing element 100.

FIG. 16C illustrates the X-Y in-plane distribution of the anisotropic strain Δϵ generated in the substrate 210.

As shown in FIG. 16A, in the example, the planar shape of the substrate 210 is circular. In the example, a diameter L1 (diameter L2) of the substrate 210 is 500 μm. Thickness Lt of the substrate 210 is 2 μm.

In the example, the outer edge 210r of the substrate 210 is set to be a perfectly constrained fixed edge. In the example, the analysis of the strain ϵ generated in the surface of the substrate 210 is performed by finite element analysis. In each of the elements divided by the finite element method, the analysis is performed while applying the Hooke's law.

In the simulation, the material of the substrate 210 is assumed to be silicon. The Young's modulus of the substrate 210 is 165 GPa, and the Poisson's ratio is 0.22. In the simulation, strain ϵ in the surface of the substrate 210 is obtained when uniform pressure of 13.33 kPa is applied from the rear face of the substrate 210. In the finite element method, in the X-Y plane, a plane mesh size is set to be 5 μm, and a mesh size in the thickness direction is 2 μm.

As shown in FIG. 16B, in the convexity near the center of the substrate 210, the first strain $\epsilon_r$ and the second strain $\epsilon_\theta$ are tensile strain. In the vicinity of the center, the substrate 210 is bent convexly. In the vicinity of the outer edge 210r, the first strain $\epsilon_r$ and the second strain $\epsilon_\theta$ are compression strain. In the vicinity of the outer edge 210r, the substrate 210 is bent concavely. In the vicinity of the center, the anisotropic strain Δϵ is zero, to be isotropic strain. In the vicinity of the outer edge 210r, the anisotropic strain Δϵ shows a value of compression, and the largest anisotropic strain can be obtained immediately near the outer edge 210r. In the circular substrate 210, the anisotropic strain Δε can be obtained always equally in radial directions from the center. The strain sensing element 100 of the embodiment is desirably disposed near the outer edge 210r of the substrate 210 where the anisotropic strain is obtained.

In FIG. 16C, the result of analysis over the entire face of the substrate 210, after converting the anisotropic strain Δε ($Δε_{r-θ}$) in the polar coordinate system shown in FIG. 16B to the anisotropic strain Δε ($Δε_{X-Y}$) in the Cartesian coordinate system, is illustrated.

In a contour diagram shown in FIG. 16C, lines shown by letters of "90%" to "10%" show positions in which anisotropic strain Δε of 90% to 10%, respectively, of the value (absolute value) of the largest anisotropic strain $Δε_{X-Y}$ in immediately near the outer edge 210r is obtained. As can be seen from FIG. 16C, the equal anisotropic strain $Δε_{X-Y}$ can be obtained in a limited region.

When the strain sensing element including such a magnetization pinned layer as described in FIGS. 3A to 3C is to be disposed in plurality on the substrate 210, since the magnetization directions of the magnetization pinned layers align in an annealing direction in a magnetic field for the purpose of pin fixing, these point to the same direction. Accordingly, when the strain sensing element is disposed in plurality on the substrate 210 to try to obtain the change in electric resistance (for example, such as polarity) for equal pressure, it is favorable, as shown in FIG. 16C, to dispose these in proximity to regions near the outer edge 210r in which equal anisotropic strains $Δε_{X-Y}$ are obtained.

In the specification of the application, "proximity" means, for example, that the distance between strain sensing elements adjacent to each other is not more than 10 μm.

Alternatively, "proximity" in the specification of the application means that a plurality of strain sensing elements are in the following case.

FIGS. 17A to 17F are schematic views showing examples of disposing strain sensing elements on the substrate. These drawings illustrate element disposing regions when a plurality of strain sensing elements are disposed in proximity.

As shown in FIG. 17A, when the substrate 210 is projected on a plane parallel to the substrate 210 (such as an X-Y plane), a circumscribing rectangle may be formed. A circumscribing rectangle 210cr circumscribes the shape of the substrate 210. The shape of the substrate 210 is, for example, a shape obtained by projecting the outer edge 210r of the substrate 210 on a plane parallel to the substrate 210. In the example, the planar shape of the substrate 210 is circular. The circumscribing rectangle 210cr forms a regular square.

The circumscribing rectangle 210cr has a first side 210s1, a second side 210s2, a third side 210s3 and a fourth side 210s4. The second side 210s2 is separated from the first side 210s1. The third side 210s3 is connected to one end 210s11 of the first side 210s1 and to one end 210s21 of the second side 210s2. The fourth side 210s4 is connected to the other end 210s12 of the first side 210s1 and to the other end 210s22 of the second side 210s2, and is separated from the third side 210s3.

The circumscribing rectangle 210cr has the centroid 210crd. For example, the centroid 210crd overlaps the centroid 210dc of the substrate 210.

The circumscribing rectangle 210cr has a first region 218a, a second region 218b, a third region 218c and a fourth region 218d.

The first region 218a is a region surrounded by a line segment linking the centroid 210crd and one end 210s11 of the first side 210s1, a line segment linking the centroid 210crd and the other end 210s12 of the first side 210s1, and the first side 210s1.

The second region 218b is a region surrounded by a line segment linking the centroid 210crd and one end 210s21 of the second side 210s2, a line segment linking the centroid 210crd and the other end 210s22 of the second side 210s2, and the second side 210s2.

The third region 218c is a region surrounded by a line segment linking the centroid 210crd and one end 210s11 of the first side 210s1, a line segment linking the centroid 210crd and one end 210s21 of the second side 210s2, and the third side 210s3.

The fourth region 218d is a region surrounded by a line segment linking the centroid 210crd and the other end 210s12 of the first side 210s1, a line segment linking the centroid 210crd and the other end 210s22 of the second side 210s2, and the fourth side 210s4.

As shown in FIG. 17A, on a part overlapping the first region 218a in the substrate 210, a plurality of sensing elements 100 are provided. For example, respective positions of at least two among the plurality of sensing elements 100 provided in a region overlapping the first region 218a in a film surface 210fs in the direction parallel to the first side 210s1 of the circumscribing rectangles 210cr are different from each other. In other words, respective positions of at least two among the plurality of sensing elements 100 provided in a region overlapping the first region 218a in the film surface 210fs are different from each other in the direction parallel to the first side 210s1 of the circumscribing rectangle 210cr. As the result of the disposition in this way, it becomes possible to dispose a large number of strain sensing elements 100 in a region near the outer edge 210r in which equal anisotropic strains $Δε_{X-Y}$ are obtained.

When the planar shape of the substrate 210 is a compressed circle as shown in FIG. 17B, too, the circumscribing rectangle 210cr can be defined. When the planar shape of the substrate 210 is a regular square as shown in FIG. 17C, too, the circumscribing rectangle 210cr can be defined. In this case, the planar shape of the circumscribing rectangle 210cr is the same regular square as the substrate 210. In the case where the planar shape of the substrate 210 is a regular square as in FIG. 17D, when the substrate 210 is provided with a curved (or straight) corner part 210sc, too, the circumscribing rectangle 210cr can be defined. When the planar shape of the substrate 210 is a rectangle as in FIG. 17E, too, the circumscribing rectangle 210cr can be defined. In this case, the planar shape of the circumscribing rectangle 210cr is the same rectangle as the substrate 210. In the case where the planar shape of the substrate 210 is a regular square as in FIG. 17F, when the substrate 210 is provided with the curved (or straight) corner part 210sc, too, the circumscribing rectangle 210cr can be defined. Thus, the first region 218a to the fourth region 218d can be defined.

As the result of disposing elements in proximity in the above-described region, it becomes possible to dispose a large number of strain sensing elements 100 in the region near the outer edge 210r in which equal anisotropic strains $Δε_{X-Y}$ are obtained.

As the result of using the magnetization free layer 20 including the first magnetic layer 21 and the second magnetic layer 22 that are magnetically coupled anti-parallel to each other via the magnetic coupling layer 23 as in the embodiment, the magnetization 21m of the first magnetic layer 21 and the magnetization 22m of the second magnetic layer 22 are coupled with polarities opposite to each other, thereby to reduce the demagnetizing field of the magnetic layer at the element end. As the result that the demagnetizing field of the magnetization free layer 20 is reduced, high strain detection sensitivity can be actualized even in a small element dimension. Consequently, the strain sensing element 100 that satisfies both high spatial resolution and high sensitivity can be provided. Accordingly, in the region near the outer edge 210r shown in FIG. 16C in which equal anisotropic strain $\Delta\epsilon_{X-Y}$ is obtained, the strain sensing element 100 satisfying both a small element dimension and high strain sensitivity can be disposed in a sufficient number.

The strain sensing element 100 of the embodiment uses the magnetization free layer 20 including the first magnetic layer 21 and the second magnetic layer 22 magnetically coupled anti-parallel to each other via the magnetic coupling layer 23, and, therefore, the leakage magnetic field from the magnetization free layer 20 is little or does not exist. Accordingly, also in the case where a large number of strain sensing elements 100 are disposed in proximity to one another in a region near the outer edge 210r shown in FIG. 16C in which equal anisotropic strain $\Delta\epsilon_{X-Y}$ is obtained, since the leakage magnetic field from the magnetization free layer 20 of the strain sensing element 100 is little or does not exist, the interference caused by the leakage magnetic field from the magnetization free layer 20 of the strain sensing element 100 can be reduced, and the change in the electric resistance for the strain in a plurality of strain sensing elements 100 can be obtained normally.

Figure 18:
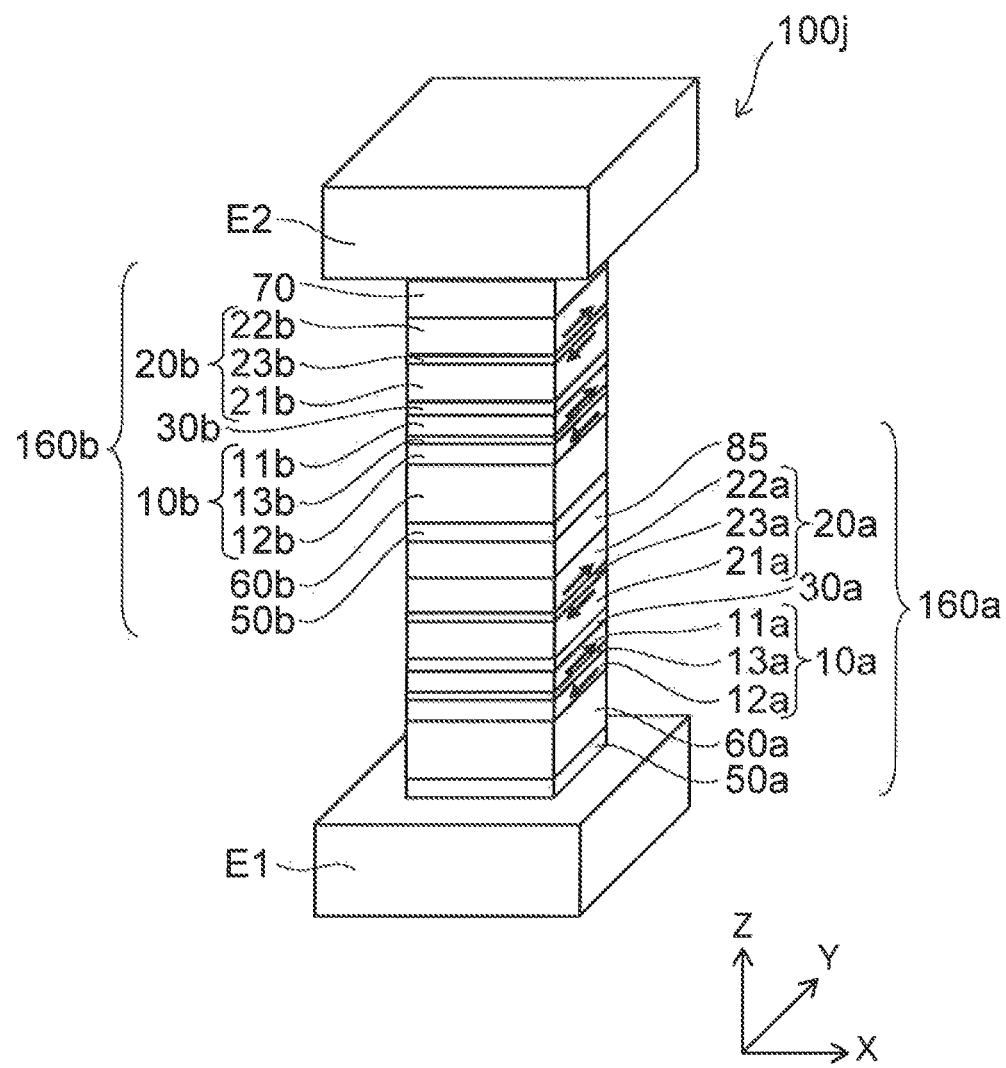
FIG. 18 is a schematic perspective view showing another example of the strain sensing element according to the embodiment.

FIG. 18 is a schematic perspective view showing another example of the strain sensing element according to the embodiment.

In FIG. 18, an example, in which the strain sensing element of the embodiment having been described hereinbefore is disposed in plurality in a stacking direction, is shown. As the result of disposing in plurality in the stacking direction, it becomes possible to dispose a large number of strain sensing elements 100 in a region near the outer edge 210r shown in FIG. 16C in which equal anisotropic strain $\Delta\epsilon_{X-Y}$ is obtained. In the strain sensing element 100 of the embodiment, since the leakage magnetic field from the magnetization free layer 20 is little or does not exist, the interference caused by the leakage magnetic field from the magnetization free layer 20 of the strain sensing element 100 can be reduced, and the change in the electric resistance for the strain in a plurality of strain sensing elements 100 can be obtained normally.

A strain sensing element 100j shown in FIG. 18 includes the first electrode E1, a first element part 160a, a second element part 160b, and the second electrode E2. Between the first electrode E1 and the second electrode E2, the first element part 160a is provided. Between the first element part 160a and the second electrode E2, the second element part 160b is provided.

The first element part 160a includes a first under layer 50a, a first pinning layer 60a, the first reference layer 10a, the first spacer layer 30a, a first magnetization free layer 20a, and an intervening layer 85. The first reference layer 10a includes the second magnetization pinned layer 12a, the first magnetization pinned layer 11a, and the magnetic coupling layer 13a. The first magnetization free layer 20a includes a first magnetic layer 21a, a second magnetic layer 22a, and the first magnetic coupling layer 23a.

Between the first electrode E1 and the second electrode E2, the first under layer 50a is provided. Between the first under layer 50a and the second electrode E2, the first pinning layer 60a is provided. Between the first pinning layer 60a and the second electrode E2, the second magnetization pinned layer 12a is provided. Between the second magnetization pinned layer 12a and the second electrode E2, the magnetic coupling layer 13a is provided. Between the magnetic coupling layer 13a and the second electrode E2, the first magnetization pinned layer 11a is provided. Between the first magnetization pinned layer 11a and the second electrode E2, the first spacer layer 30a is provided. Between the first spacer layer 30a and the second electrode E2, the first magnetic layer 21a is provided. Between the first magnetic layer 21a and the second electrode E2, the first magnetic coupling layer 23a is provided. Between the first magnetic coupling layer 23a and the second electrode E2, the second magnetic layer 22a is provided. Between the second magnetic layer 22a and the second electrode E2, the intervening layer 85 is provided.

The second element part 160b includes a second under layer 50b, the second pinning layer 60b, the second reference layer 10b, the second spacer layer 30b, the second magnetization free layer 20b, and the cap layer 70. The second reference layer 10b includes the second magnetization pinned layer 12b, the first magnetization pinned layer 11b, and the magnetic coupling layer 13b. The second magnetization free layer 20b includes a first magnetic layer 21b, a second magnetic layer 22b, and the second magnetic coupling layer 23b.

Between the intervening layer 85 and the second electrode E2, the second under layer 50b is provided. Between the second under layer 50b and the second electrode E2, the second pinning layer 60b is provided. Between the second pinning layer 60b and the second electrode E2, the second magnetization pinned layer 12b is provided. Between the second magnetization pinned layer 12b and the second electrode E2, the magnetic coupling layer 13b is provided. Between the magnetic coupling layer 13b and the second electrode E2, the first magnetization pinned layer 11b is provided. Between the first magnetization pinned layer 11b and the second electrode E2, the second spacer layer 30b is provided. Between the second spacer layer 30b and the second electrode E2, the first magnetic layer 21b is provided. Between the first magnetic layer 21b and the second electrode E2, the second magnetic coupling layer 23b is provided. Between the second magnetic coupling layer 23b and the second electrode E2, the second magnetic layer 22b is provided. Between the second magnetic layer 22b and the second electrode E2, the cap layer 70 is provided.

For each of layers included in the strain sensing element 100j, for example, materials described in relation to the strain sensing element 100a can be used. For the intervening layer 85, for example, a nonmagnetic material can be used. For the intervening layer 85, for example, a metal material can be used. For the intervening layer 85, the same material as the material for the first electrode E1 or the second electrode E2 can be used.

Figure 19A:
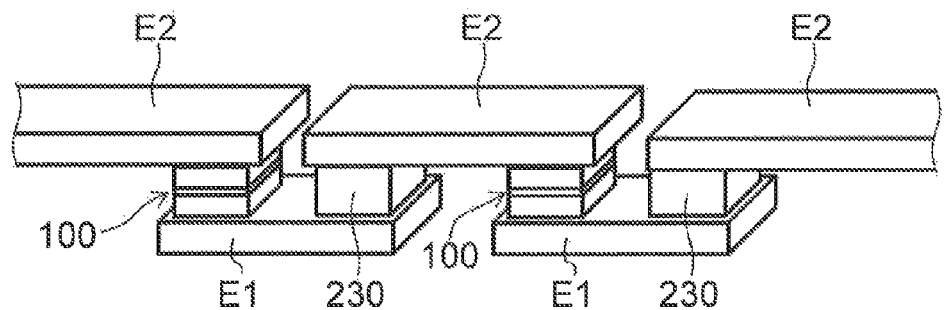
FIGS. 19A to 19C are schematic perspective views illustrating the pressure sensor according to the embodiment.
Figure 19B:
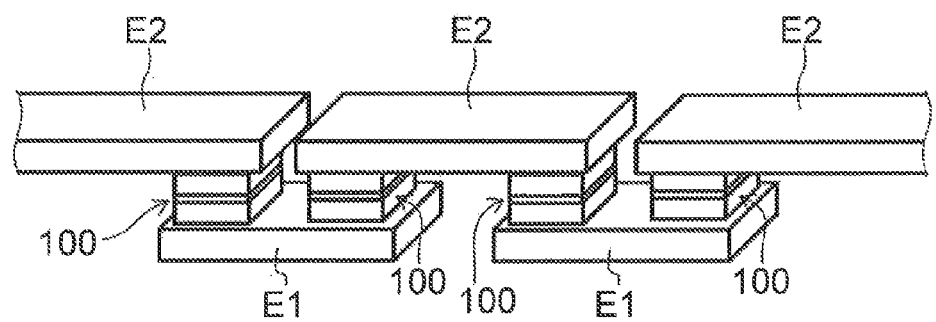
Figure 19C:
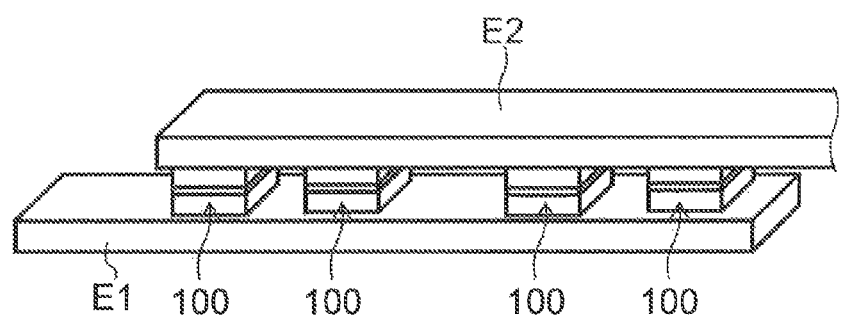

FIGS. 19A to 19C are schematic perspective views illustrating the pressure sensor according to the embodiment.

FIGS. 19A to 19C show an example of the connection of a plurality of strain sensing elements 100.

As shown in FIG. 19A, in the case where a plurality of strain sensing elements 100 are connected electrically in series, between the first electrode E1 (such as first wiring 221) and the second electrode E2 (such as second wiring 222), the strain sensing element 100 and a via contact 230 are provided. Consequently, a current-supplying direction is in one direction. The current supplied to the plurality of strain sensing elements 100 flows downward or upward. In the connection, signal/noise characteristics of each of the plurality of strain sensing elements 100 can be made close to one another.

As shown in FIG. 19B, the via contact 230 is not provided, but the strain sensing element 100 is disposed between the first electrode E1 and the second electrode E2. In the example, directions of currents to be supplied to each of adjacent two strain sensing elements 100 are opposite to each other. In the connection, the disposition density of a plurality of strain sensing elements 100 is high.

As shown in FIG. 19C, between one first electrode E1 and one second electrode E2, a plurality of strain sensing elements 100 are provided. The plurality of strain sensing elements 100 are connected in parallel.

Hereinafter, an example of method of manufacturing the pressure sensor according to the embodiment will be described. The following is an example of a method of manufacturing a pressure sensor.

FIGS. 20A to 20E are schematic cross-sectional views along process sequence illustrating a method of manufacturing the pressure sensor according to the embodiment.

Figure 20A:
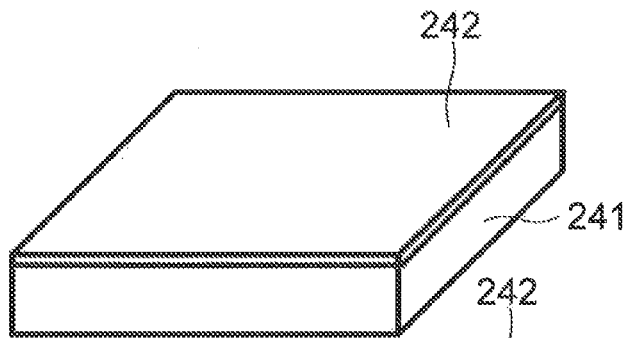
FIGS. 20A to 20E are schematic cross-sectional views along process sequence illustrating a method of manufacturing the pressure sensor according to the embodiment.

As shown in FIG. 20A, on a base body 241 (such as a Si substrate), a thin film 242 is formed. The base body 241 serves as the supporting part 201. The thin film 242 serves as the substrate 210.

For example, on the Si substrate, the thin film 242 of $SiO_x$/Si is formed by sputtering. As the thin film 242, an $SiO_x$ single layer, an SiN single layer, or a layer of metal such as Al may be used. Further, as the thin film 242, a flexible plastic material such as polyimide or a paraxylylene-based polymer may be used. An SOI (Silicon On Insulator) substrate may be used as the base body 241 and the thin film 242. In SOI, for example, a stacked film of $SiO_2$/Si is formed on a Si substrate by lamination of substrates.

Figure 20B:
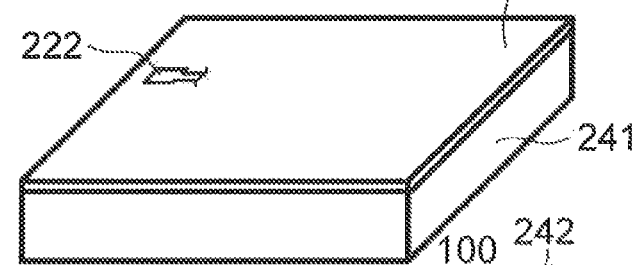

As shown in FIG. 20B, the second wiring 222 is formed. In the process, a conductive film to be the second wiring 222 is formed, and the conductive film is processed by photolithography and etching. When the periphery of the second wiring 222 is to be embedded with an insulating film, a liftoff process may be applied. In the liftoff treatment, for example, after the etching of the pattern of the second wiring 222 but before exfoliating a resist, the insulating film is deposited over the entire face, and, subsequently, the resist is removed.

Figure 20C:
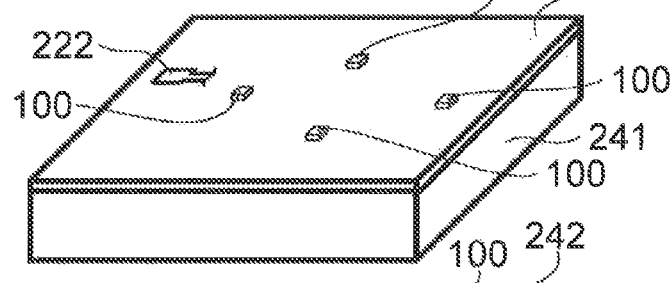

As shown in FIG. 20C, the strain sensing element 100 is formed. In the process, a stacked body to work as the strain sensing element 100 is formed, and the stacked body is processed by photolithography and etching. When the side wall of the stacked body of the strain sensing element 100 is to be embedded with the insulating layer 81, a liftoff treatment may be applied. In the liftoff treatment, for example, after processing the stacked body but before exfoliating a resist, the insulating layer 81 is deposited over the entire face, and, subsequently, the resist is removed.

Figure 20D:
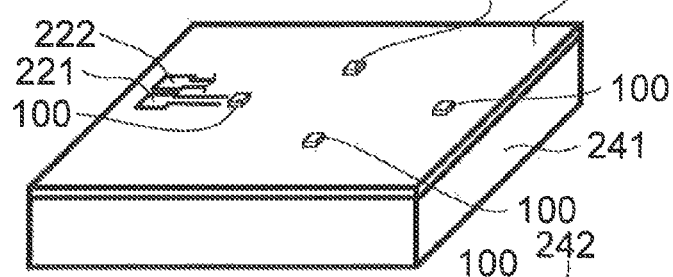

As shown in FIG. 20D, the first wiring 221 is formed. In the process, a conductive film to be the first wiring 221 is formed, and the conductive film is processed by photolithography and etching. When the periphery of the first wiring 221 is to be embedded with an insulating film, a liftoff treatment may be applied. In the liftoff treatment, for example, after the etching of the pattern of the first wiring 221 but before exfoliating a resist, the insulating film is deposited over the entire face, and, subsequently, the resist is removed.

Figure 20E:
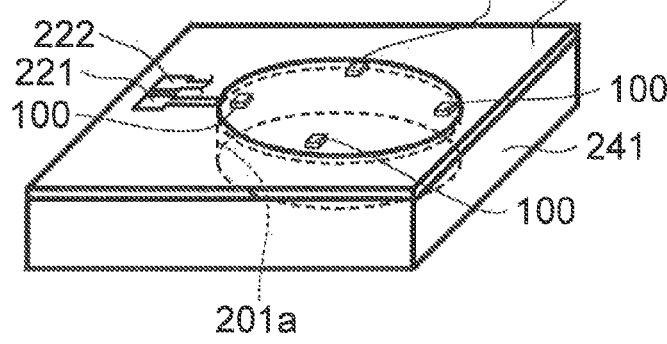

As shown in FIG. 20E, etching is performed from the rear face of the base body 241 to form the hollow part 201a. Consequently, the substrate 210 and the supporting part 201 are formed. For example, when the stacked film of $SiO_x$/Si is used as the thin film 242 that serves as the substrate 210, deep-digging processing of the base body 241 is performed from the rear face (lower face) of the thin film 242 toward the front face (upper face). Consequently, the hollow part 201a is formed. In the formation of the hollow part 201a, for example, a double-sided aligner exposure apparatus can be used. Consequently, a hole pattern of the resist can be patterned on the rear face in accordance with the position of the strain sensing element 100 on the front face.

In the etching of the Si substrate, for example, a Bosch process using RIE can be used. In the Bosch process, for example, an etching process using $SF_6$ gas and a deposition process using $C_4F_8$ gas are repeated. Consequently, while suppressing the etching of side wall of the base body 241, etching is performed selectively in the depth direction (Z-axis direction) of the base body 241. As an endpoint of the etching, for example, an $SiO_x$ layer is used. That is, using the $SiO_x$ layer having a selection ratio of the etching different from the selection ratio of etching of Si, the etching is terminated. The $SiO_x$ layer that functions as an etching stopper layer may be used as a part of the substrate 210. The $SiO_x$ layer may be removed after the etching, for example, by a treatment or the like with hydrogen fluoride anhydride and alcohol, or the like.

In this way, the pressure sensor 200 according to the embodiment is formed. Other pressure sensors according to the embodiment can be formed by a similar method.

Third Embodiment

Figure 21A:
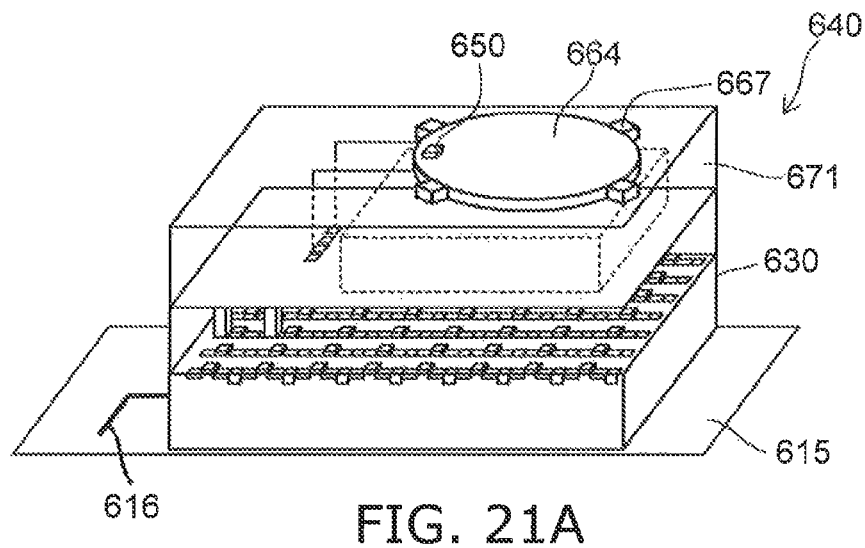
FIGS. 21A to 21C are schematic views illustrating the pressure sensor according to the embodiment.
Figure 21B:
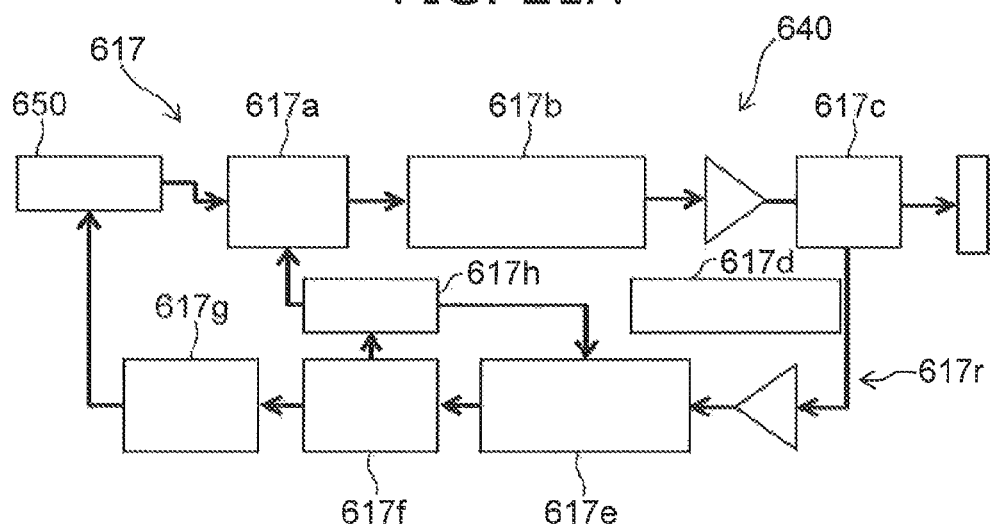
Figure 21C:
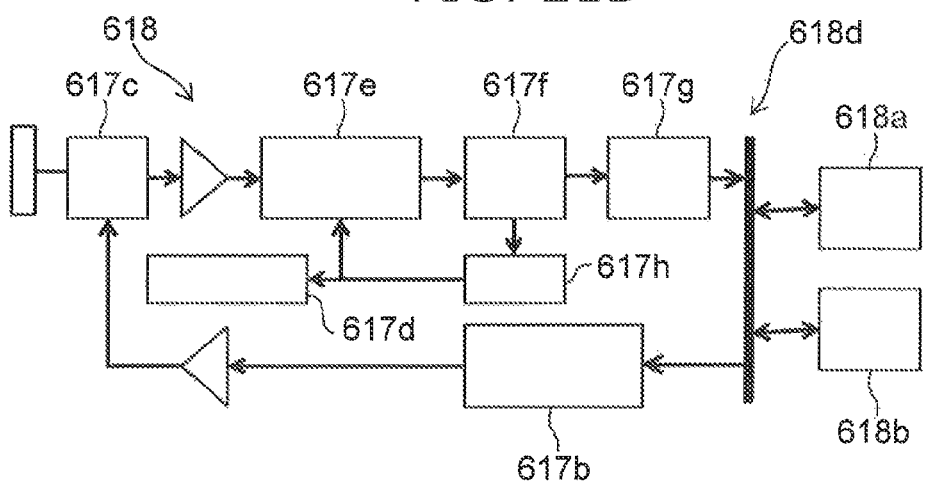

FIGS. 21A to 21C are schematic views illustrating the pressure sensor according to the embodiment. FIG. 21A is a schematic perspective view, and FIGS. 21B and 21C are block diagrams illustrating a pressure sensor 640.

As shown in FIGS. 21A and 21B, in the pressure sensor 640, a base part 671, a detection part 650, a semiconductor circuit part 630, an antenna 615, an electric wiring 616, a transmitting circuit 617, and a receiving circuit 617r are provided.

The antenna 615 is connected electrically with the semiconductor circuit part 630 via the electric wiring 616.

The transmitting circuit 617 transmits wirelessly data based on an electric signal flowing to the detection part 650. At least a part of the transmitting circuit 617 can be provided in the semiconductor circuit part 630.

The receiving circuit 617r receives a control signal from an electronic device 618d. At least a part of the receiving circuit 617r can be provided in a semiconductor circuit part 630. When the receiving circuit 617r is to be provided, for example, by operating the electronic device 618d, the operation of the pressure sensor 640 can be controlled.

As shown in FIG. 21B, in the transmitting circuit 617, for example, an AD converter 617a connected to the detection part 650, and a Manchester encoding part 617b can be provided. A switching part 617c can be provided so as to switch transmission and reception. In this case, a timing controller 617d can be provided so as to control the switching in the switching part 617c by the timing controller 617d. Furthermore, a data correction part 617e, a synchronization part 617f, a judgment part 617g, and a voltage-controlled oscillator 617h (VCO) can be provided.

As shown in FIG. 21C, in the electronic device 618d used in combination with the pressure sensor 640, a receiving part 618 is provided. As the electronic device 618d, for example, an electronic device such as a portable terminal can be exemplified.

In this case, the pressure sensor 640 having the transmitting circuit 617 and the electronic device 618d having the receiving part 618 can be used in combination.

In the electronic device 618d, the Manchester encoding part 617b, the switching part 617c, the timing controller 617d, the data correction part 617e, the synchronization part 617f, the judgment part 617g, the voltage-controlled oscillator 617h, a memory part 618a, a central processing unit 618b (CPU) can be provided.

In the example, the pressure sensor 640 furthermore includes a fixing part 667. The fixing part 667 fixes a film part 664 to the base part 671. The thickness dimension of the fixing part 667 can be set to be larger than the dimension of the film part 664 so that the fixing part 667 is hard to bend even when external pressure is applied.

The fixing part 667 can be provided, for example, in the periphery of the film part 664 at regular intervals.

The fixing part 667 can also be provided so as to surround continuously the entire periphery of the film part 664.

The fixing part 667 can be formed, for example, of the material same as the material of the base part 671. In this case, the fixing part 667 can be formed, for example, of silicon or the like.

The fixing part 667 can also be formed, for example, of the material same as the material of the film part 664.

An example of the method of manufacturing the pressure sensor according to the embodiment will be described.

FIGS. 22A, 22B, 23A, 23B, 24A, 24B, 25A, 25B, 26A, 26B, 27A, 27B, 28A, 28B, 29A, 29B, 30A, 30B, 31A, 31B, 32A, 32B, 33A and 33B are schematic views illustrating the method of manufacturing the pressure sensor according to the embodiment.

In FIGS. 22A to 33B, a series of "A" are schematic plan views, and a series of "B" are schematic cross-sectional views.

Figure 22A:
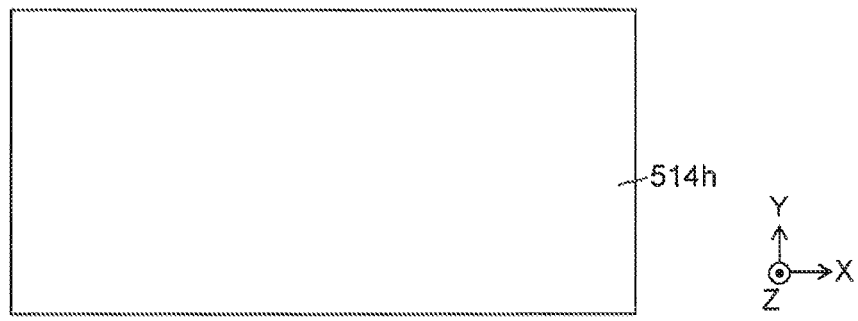
FIGS. 22A and 22B are schematic views illustrating the method of manufacturing the pressure sensor according to the embodiment.
Figure 22B:
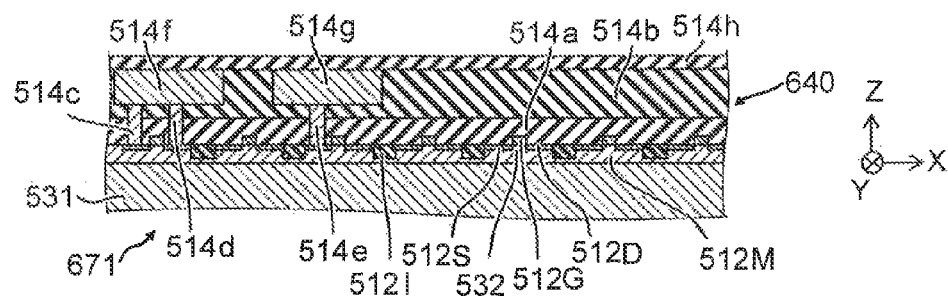

As shown in FIGS. 22A and 22B, in a surface part of a semiconductor substrate 531, a semiconductor layer 512M is formed. Subsequently, on the upper face of the semiconductor layer 512M, an element isolation insulating layer 512I is formed. Subsequently, on the semiconductor layer 512M, a gate 512G is formed via an insulating layer not shown. Subsequently, on both sides of the gate 512G, a source 512S and a drain 512D are formed to form a transistor 532. Subsequently, an interlayer insulating film 514a is formed thereon, and, furthermore, an interlayer insulating film 514b is formed.

Subsequently, in a region to be a non-hollow part, for parts of the interlayer insulating films 514a and 514b, a trench and a hole are formed. Subsequently, a conductive material is embedded into the hole to form connection pillars 514c to 514e. In this case, for example, the connection pillar 514c is connected electrically to the source 512S of one transistor 532, and the connection pillar 514d is connected electrically to the drain 512D. For example, the connection pillar 514e is connected electrically to the source 512S of another transistor 532. Subsequently, a conductive material is embedded into the trench, and wiring parts 514f and 514g are formed. The wiring part 514f is connected electrically to the connection pillar 514c and the connection pillar 514d. The wiring part 514g is connected electrically to the connection pillar 514e. Subsequently, on the interlayer insulating film 514b, an interlayer insulating film 514h is formed.

Figure 23A:
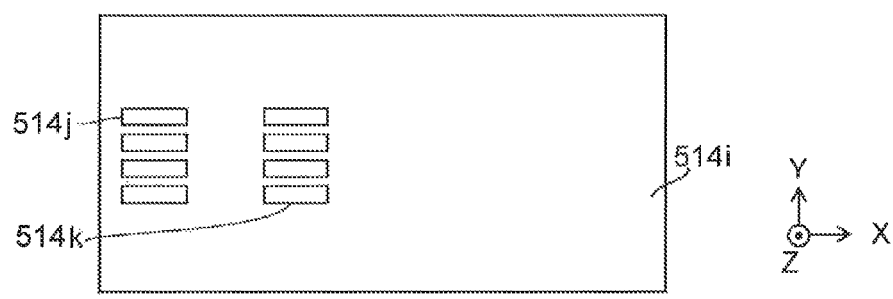
FIGS. 23A and 23B are schematic views illustrating the method of manufacturing the pressure sensor according to the embodiment.
Figure 23B:
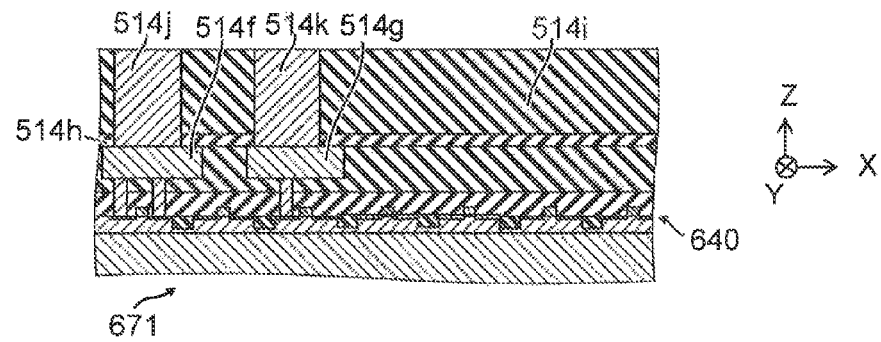

As shown in FIGS. 23A and 23B, on the interlayer insulating film 514h, an interlayer insulating film 514i containing silicon oxide ($SiO_2$) is formed, for example, using a CVD (Chemical Vapor Deposition) method. Subsequently, in a predetermined position of the interlayer insulating film 514i, a hole is formed, which is embedded with a conductive material (such as a metal material) and the upper face is planarized using a CMP (Chemical Mechanical Polishing) method. Consequently, a connection pillar 514j connected to the wiring part 514f and a connection pillar 514k connected to the wiring part 514g are formed.

Figure 24A:
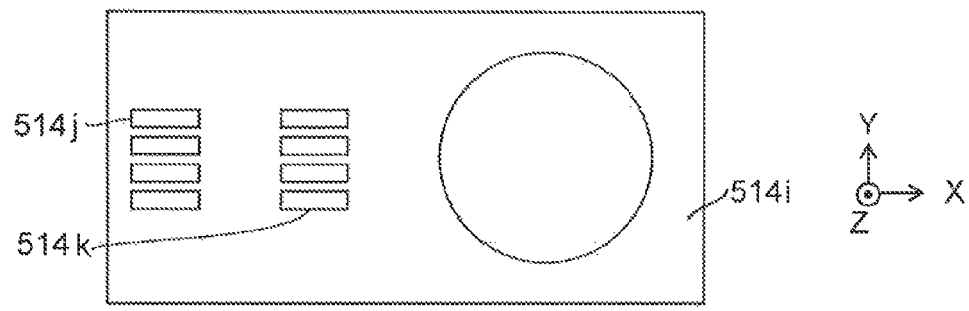
FIGS. 24A and 24B are schematic views illustrating the method of manufacturing the pressure sensor according to the embodiment.
Figure 24B:
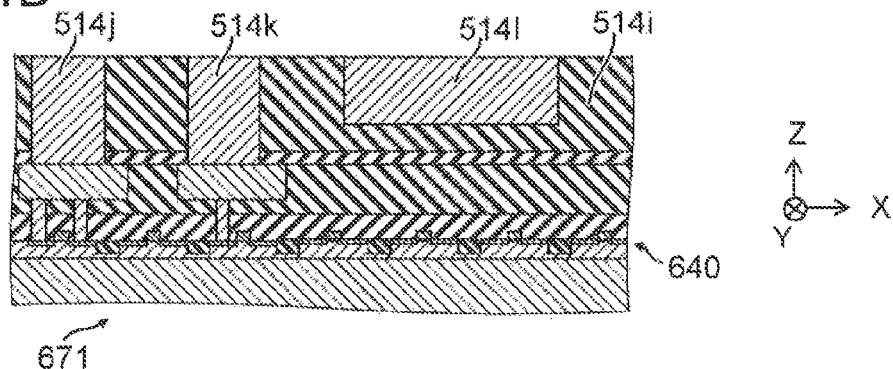

As shown in FIGS. 24A and 24B, in a region to be a hollow part 570 of the interlayer insulating film 514i, a concave part is formed, and, into the concave part, a sacrificial layer 514l is embedded. The sacrificial layer 514l can be formed, for example, using a material capable of being deposited at low temperatures. The material capable of being deposited at low temperatures is, for example, silicon germanium (SiGe) etc.

Figure 25A:
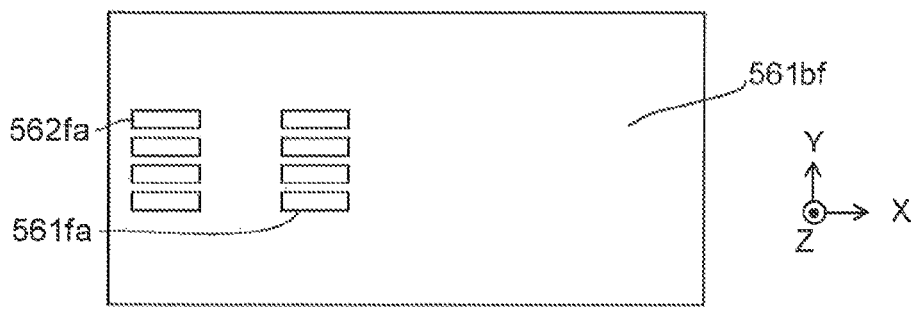
FIGS. 25A and 25B are schematic views illustrating the method of manufacturing the pressure sensor according to the embodiment.
Figure 25B:
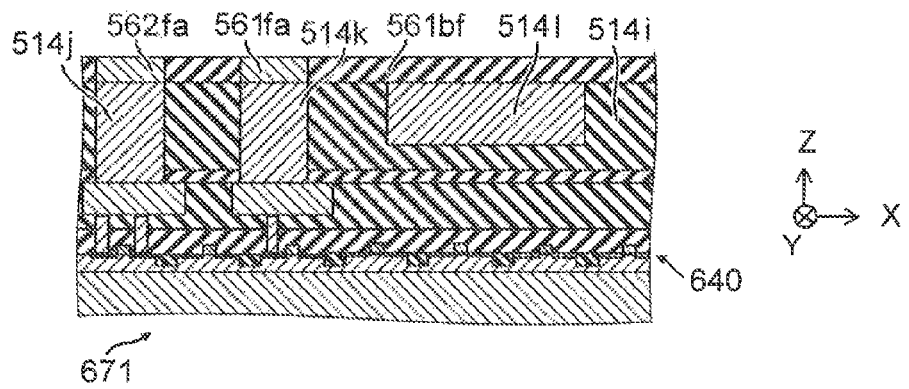

As shown in FIGS. 25A and 25B, on the interlayer insulating film 514i and the sacrificial layer 514l, an insulating film 561bf to be a film part 564 is formed. The insulating film 561bf can be formed, for example, using silicon oxide ($SiO_2$) or the like. For the insulating film 561bf, a plurality of holes are provided, and, into the plurality of holes, a conductive material (such as a metal material) is embedded to form a connection pillar 561fa and a connection pillar 562fa. The connection pillar 561fa is connected electrically with the connection pillar 514k and the connection pillar 562fa is connected electrically with the connection pillar 514j.

Figure 26A:
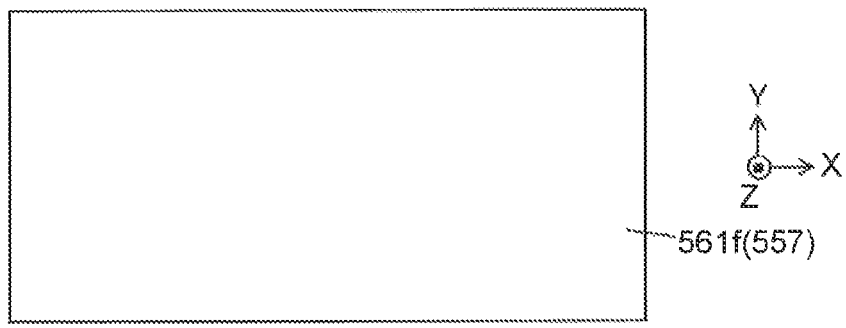
FIGS. 26A and 26B are schematic views illustrating the method of manufacturing the pressure sensor according to the embodiment.
Figure 26B:
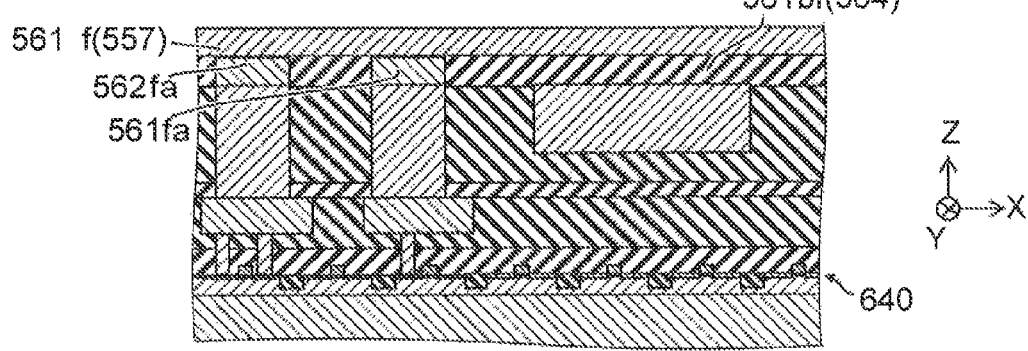

As shown in FIGS. 26A and 26B, on the insulating film 561bf, the connection pillar 561fa, and the connection pillar 562fa, a conductive layer 561f to be a wiring 557 is formed.

Figure 27A:
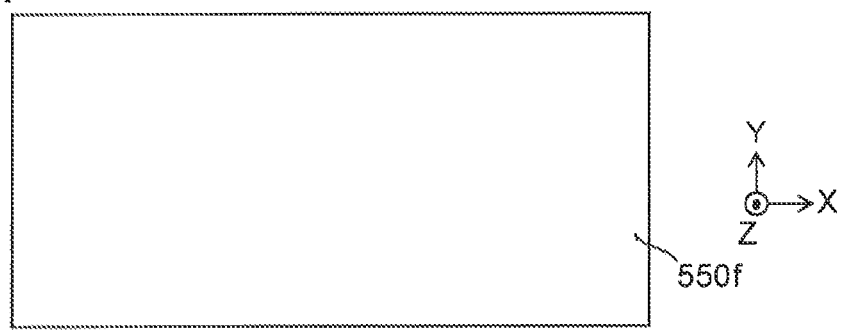
FIGS. 27A and 27B are schematic views illustrating the method of manufacturing the pressure sensor according to the embodiment.
Figure 27B:
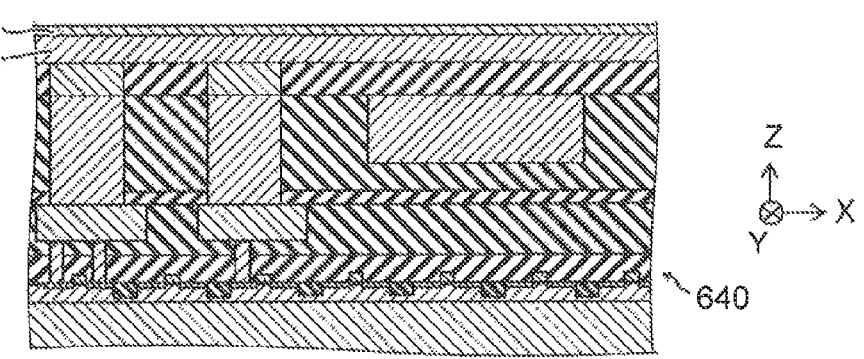

As shown in FIGS. 27A and 27B, on the conductive layer 561f, a stacked film 550f is formed.

Figure 28A:
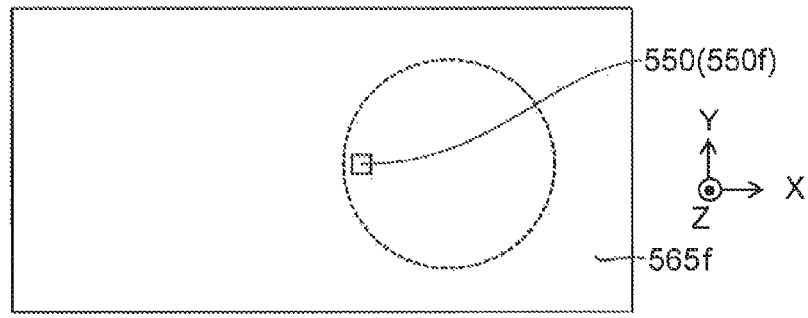
FIGS. 28A and 28B are schematic views illustrating the method of manufacturing the pressure sensor according to the embodiment.
Figure 28B:
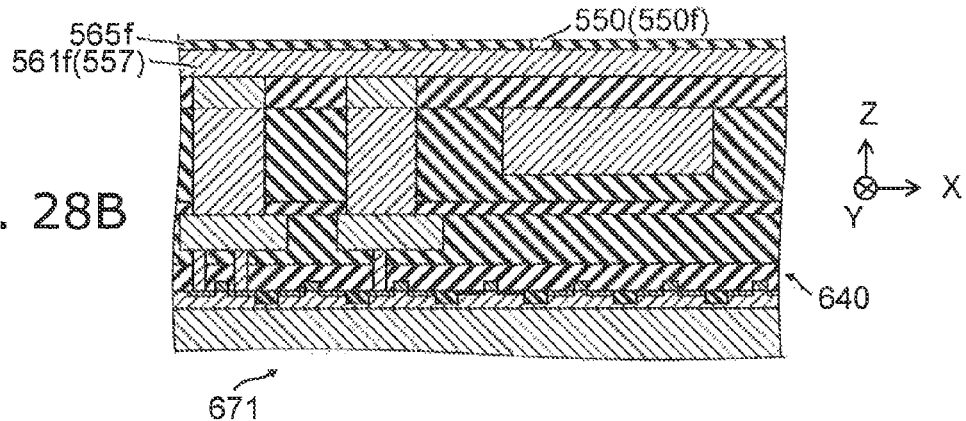

As shown in FIGS. 28A and 28B, the stacked film 550f is processed into a predetermined shape, and an insulating film 565f to be an insulating layer 565 is formed thereon. The insulating film 565f can be formed, for example, using silicon oxide ($SiO_2$) or the like.

Figure 29A:
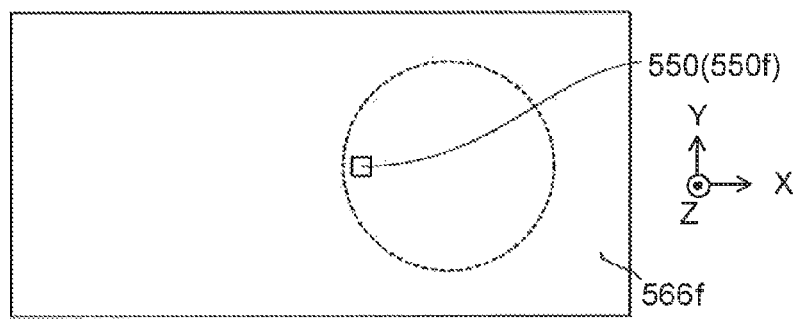
FIGS. 29A and 29B are schematic views illustrating the method of manufacturing the pressure sensor according to the embodiment.
Figure 29B:
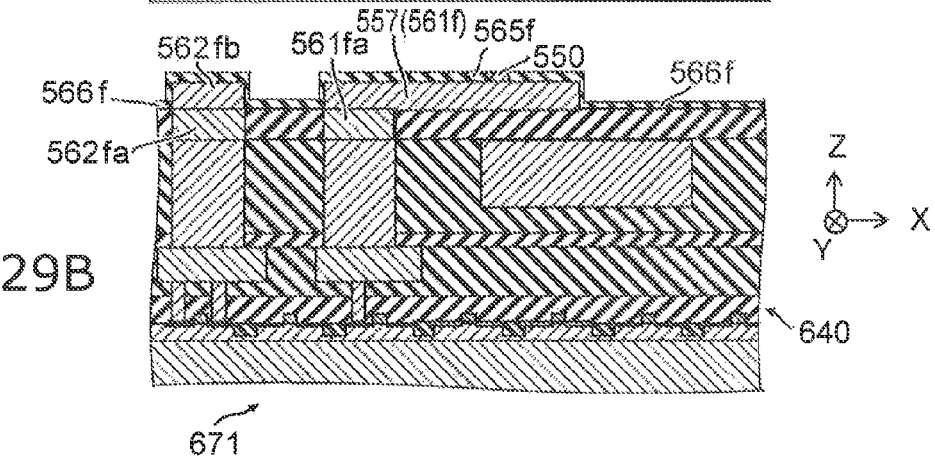

As shown in FIGS. 29A and 29B, a part of the insulating film 565f is removed, and the conductive layer 561f is processed into a predetermined shape. Consequently, the wiring 557 is formed. At this time, a part of the conductive layer 561f becomes a connection pillar 562fb connected electrically to the connection pillar 562fa. Furthermore, an insulating film 566f to be an insulating layer 566 is formed thereon.

Figure 30A:
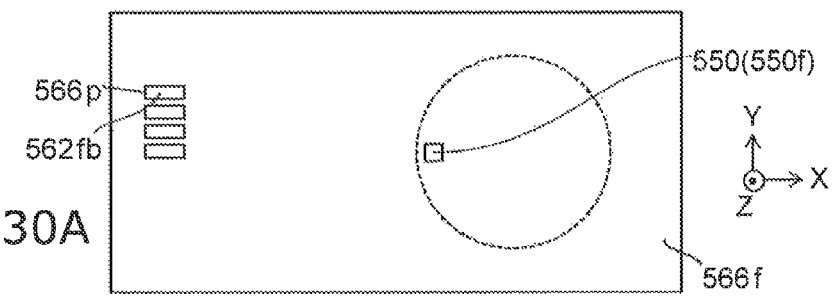
FIGS. 30A and 30B are schematic views illustrating the method of manufacturing the pressure sensor according to the embodiment.
Figure 30B:
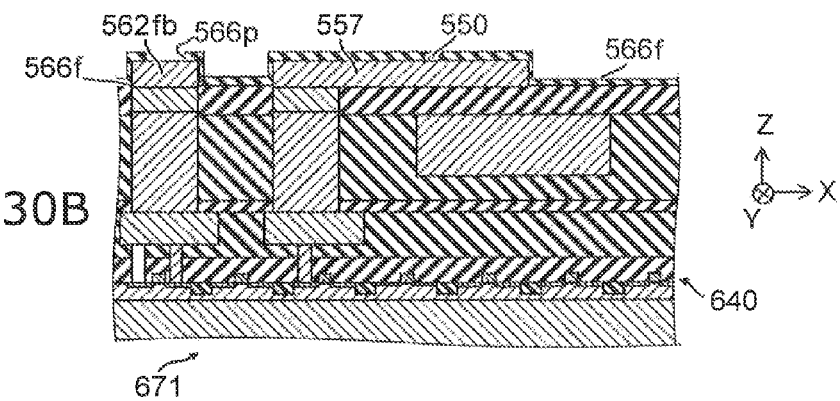

As shown in FIGS. 30A and 30B, in the insulating film 566f, an opening part 566p is formed. Consequently, the connection pillar 562fb is exposed.

Figure 31A:
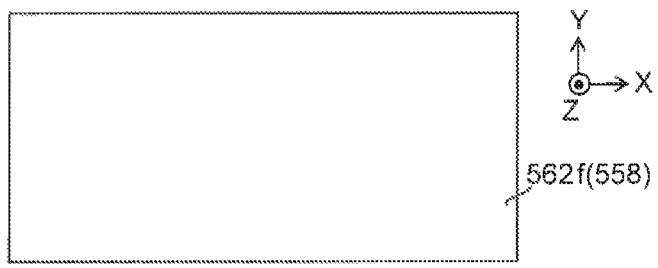
FIGS. 31A and 31B are schematic views illustrating the method of manufacturing the pressure sensor according to the embodiment.
Figure 31B:
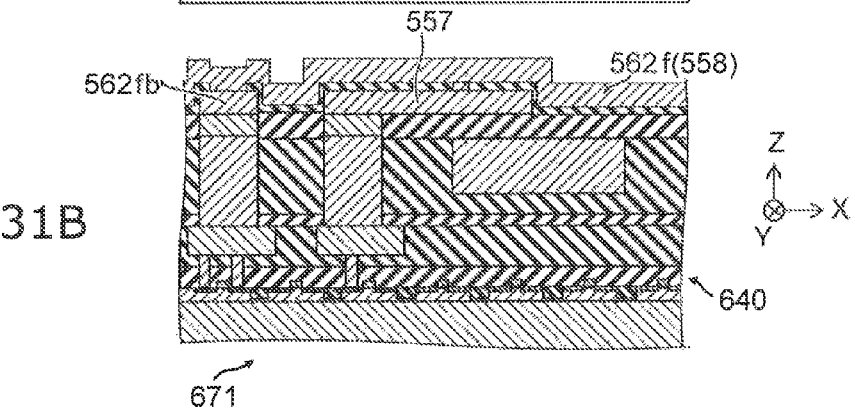

As shown in FIGS. 31A and 31B, on the upper face, a conductive layer 562f to be a wiring 558 is formed. A part of the conductive layer 562f is connected electrically with the connection pillar 562fb.

Figure 32A:
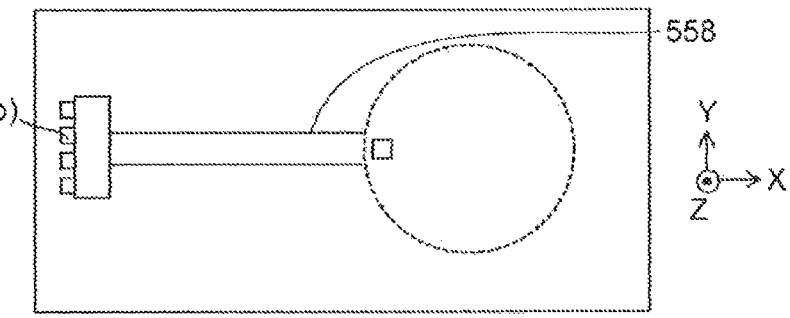
FIGS. 32A and 32B are schematic views illustrating the method of manufacturing the pressure sensor according to the embodiment.
Figure 32B:
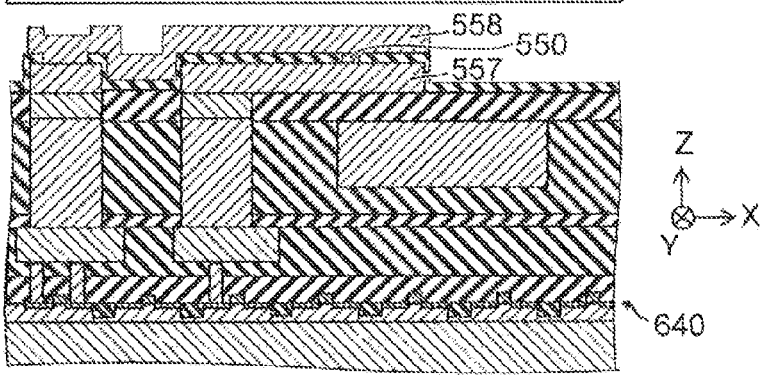

As shown in FIGS. 32A and 32B, the conductive layer 562f is processed into a predetermined shape. Consequently, the wiring 558 is formed. The wiring 558 is connected electrically with the connection pillar 562fb.

Figure 33A:
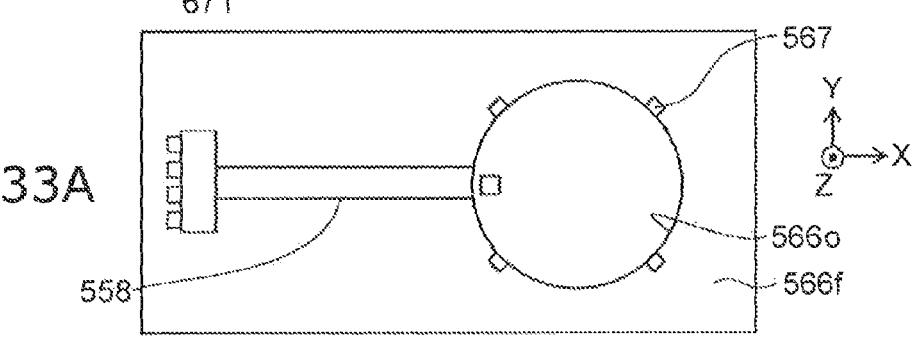
FIGS. 33A and 33B are schematic views illustrating the method of manufacturing the pressure sensor according to the embodiment.
Figure 33B:
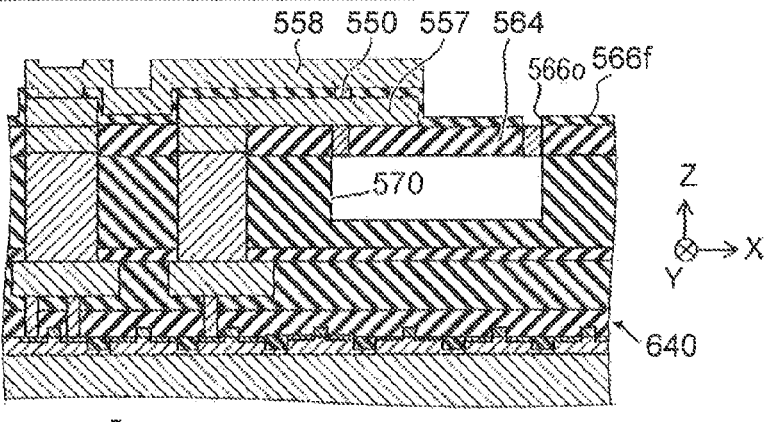

As shown in FIGS. 33A and 33B, in the insulating film 566f, an opening part 566o of a predetermined shape is formed. Via the opening part 566o, the insulating film 561bf is processed and, furthermore, via the opening part 566o, the sacrificial layer 514l is removed. Consequently, the hollow part 570 is formed. The removal of the sacrificial layer 514l can be performed, for example, using a wet etching method.

When the fixing part 567 is to be formed into a ring shape, for example, the space between the fringe of the non-hollow part above the hollow part 570 and the film part 564 is embedded with an insulating film.

The pressure sensor is formed in the above-described way.

Fourth Embodiment

Figure 34:
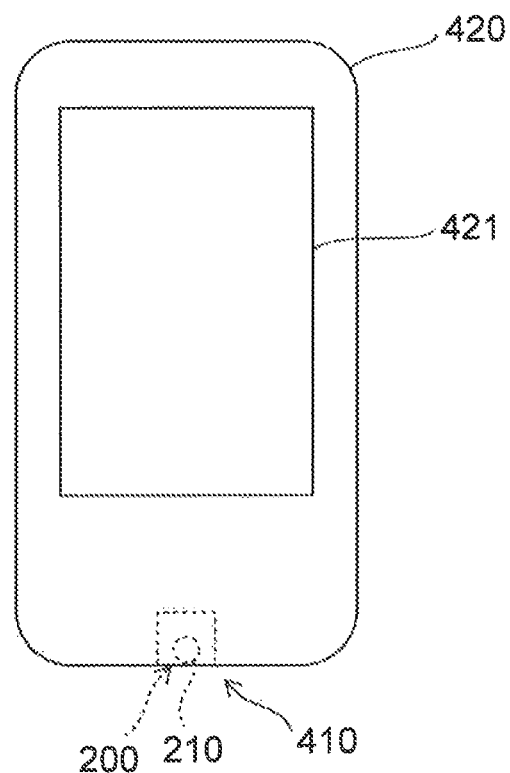
FIG. 34 is a schematic plan view illustrating a microphone according to a fourth embodiment.

FIG. 34 is a schematic plan view illustrating a microphone according to a fourth embodiment.

As shown in FIG. 34, a microphone 410 has an arbitrary pressure sensor according to aforementioned respective embodiments (such as the pressure sensor 200), or a pressure sensor according to a variation thereof. In the following, as an example, the microphone 410 having the pressure sensor 200 will be exemplified.

The microphone 410 is incorporated in an end part of a portable information terminal 420. The substrate 210 of the pressure sensor 200 provided in the microphone 410 can be set, for example, to be substantially parallel to a face on which a display part 421 of the portable information terminal 420 is provided. Disposition of the substrate 210 is not limited to the illustrated disposition, but can be changed appropriately.

Since the microphone 410 includes the pressure sensor 200 etc., the sensitivity thereof can be made high for frequency of wide area.

Although the case where the microphone 410 is incorporated in the portable information terminal 420 is exemplified, the case is not limited to this. The microphone 410 can be incorporated, for example, in IC recorders, pin microphones, etc.

Fifth Embodiment

The embodiment relates to an acoustic microphone using a pressure sensor of each of above-described embodiments.

Figure 35:
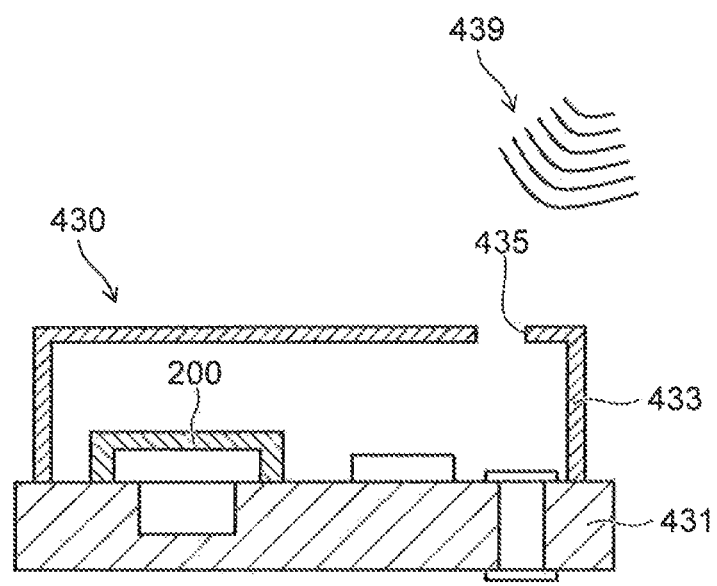
FIG. 35 is a schematic cross-sectional view illustrating the acoustic microphone according to a fifth embodiment.

FIG. 35 is a schematic cross-sectional view illustrating the acoustic microphone according to a fifth embodiment.

An acoustic microphone 430 according to the embodiment includes a printed-circuit board 431, a cover 433, and the pressure sensor 200. The printed-circuit board 431 includes, for example, a circuit such as an amplifier. In the cover 433, an acoustic hole 435 is provided. Sound 439 enters the inside of the cover 433 through the acoustic hole 435.

As the pressure sensor 200, any of the pressure sensors described in relation to each of above-described embodiments, or a variation thereof is used.

The acoustic microphone 430 responds to sound pressure. As the result of using the pressure sensor 200 with high sensitivity, the acoustic microphone 430 with high sensitivity can be obtained. For example, the pressure sensor 200 is mounted on the printed-circuit board 431, and an electric signal wire is provided. So as to cover the pressure sensor 200, the cover 433 is provided on the printed-circuit board 431.

According to the embodiment, an acoustic microphone with high sensitivity can be provided.

Sixth Embodiment

The embodiment relates to a blood pressure sensor using the pressure sensor of each of above-mentioned embodiments.

FIGS. 36A and 36B are schematic views illustrating the blood pressure sensor according to a sixth embodiment.

FIG. 36A is a schematic plan view illustrating the skin over an arterial vessel of a human being. FIG. 36B is a cross-sectional view along an H1-H2 line in FIG. 36A.

In the embodiment, the pressure sensor 200 is applied as a blood pressure sensor 440. For the pressure sensor 200, any of pressure sensors described in relation to each of above-described embodiments, or a variation thereof is used.

Consequently, pressure detection with high sensitivity becomes possible with a small-sized pressure sensor. By pushing the pressure sensor 200 to a skin 443 over an arterial vessel 441, the blood pressure sensor 440 can perform continuously a blood-pressure measurement.

According to the embodiment, a blood pressure sensor with high sensitivity can be provided.

Seventh Embodiment

The embodiment relates to a touch panel using the pressure sensor of each of above-mentioned embodiments.

FIG. 37 is a schematic plan view illustrating the touch panel according to a seventh embodiment.

In the embodiment, the pressure sensor 200 is used as a touch panel 450. For the pressure sensor 200, any of pressure sensors described in relation to each of above-described embodiments, or a variation thereof is used. In the touch panel 450, the pressure sensor 200 is mounted on at least one of the inside of a display or the outside of the display.

For example, the touch panel 450 includes a plurality of first wirings 451, a plurality of second wirings 452, a plurality of pressure sensors 200, and a control part 453.

In the example, the plurality of first wirings 451 are in a row along the Y-axis direction. Each of the plurality of first wirings 451 extends along the X-axis direction. The plurality of second wirings 452 are in a row along the X-axis direction. Each of the plurality of second wirings 452 extends along the Y-axis direction.

Each of the plurality of pressure sensors 200 is provided at each of intersections of the plurality of first wirings 451 and the plurality of second wirings 452. One pressure sensor 200 works as one detection element 200e for detection. Here, the intersection includes the position in which the first wiring 451 and the second wiring 452 intersect and periphery regions thereof.

One end 251 of each of the plurality of pressure sensors 200 is connected with each of the plurality of first wirings 451. The other end 252 of each of the plurality of pressure sensors 200 is connected with each of the plurality of second wirings 452.

The control part 453 is connected to the plurality of first wirings 451 and the plurality of second wirings 452.

For example, the control part 453 includes a circuit 453a for first wiring connected to the plurality of first wirings 451, a circuit 453b for second wiring connected to the plurality of second wirings 452, and a control circuit 455 connected to the circuit 453a for first wiring and the circuit 453b for second wiring.

The pressure sensor 200 may perform pressure sensing with high sensitivity in a reduced size. Therefore, a touch panel with high-definition may be actualized.

The pressure sensors according to each of the above-described embodiments can be applied for various pressure sensor devices such as an air pressure sensor and a pneumatic sensor for a tire, in addition to above-described applications.

According to the embodiments, a strain sensing element, a pressure sensor, a microphone, a blood pressure sensor and a touch panel with high sensitivity can be provided.

Hereinabove, exemplary embodiments of the invention are described with reference to specific examples. However, the invention is not limited to these specific examples. For example, one skilled in the art may similarly practice the invention by appropriately selecting specific configurations of components such as the substrate, the strain sensing element, the first magnetic layer, the second magnetic layer and the spacer layer included in the strain sensing element, the pressure sensor, the microphone, the blood pressure sensor and the touch panel, from known art. Such practice is included in the scope of the invention to the extent that similar effects thereto are obtained.

Further, any two or more components of the specific examples may be combined within the extent of technical feasibility and are included in the scope of the embodiments to the extent that the spirit of the embodiments is included.

Moreover, all strain sensing elements, pressure sensors, microphones, blood pressure sensors and touch panels practicable by an appropriate design modification by one skilled in the art based on the strain sensing elements, the pressure sensors, the microphones, the blood pressure sensors and the touch panels described above as embodiments of the invention also are within the scope of the invention to the extent that the purport of the embodiments of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A strain sensing element to be provided on a substrate, the substrate being deformable, the element comprising:
   a reference layer;
   a first magnetic layer;
   a second magnetic layer, the first magnetic layer being provided between the reference layer and the second magnetic layer;
   a spacer layer provided between the reference layer and the first magnetic layer; and
   a magnetic coupling layer provided between the first magnetic layer and the second magnetic layer, the magnetic coupling layer including at least one selected from a group consisting of Ru, Rh and Ir,
   both of a first magnetization of the first magnetic layer and a second magnetization of the second magnetic layer being configured to change in accordance with a deformation of the substrate, and
   a first polarity of a magnetostriction constant of the first magnetic layer being the same as a second polarity of a magnetostriction constant of the second magnetic layer.

2. The strain sensing element according to claim 1, wherein at least one of the first magnetic layer and the second magnetic layer contains an amorphous material.

3. The strain sensing element according to claim 1, wherein at least one of the first magnetic layer and the second magnetic layer contains boron.

4. The strain sensing element according to claim 1, wherein the first magnetic layer comprises a region including cobalt, and the region contacts the intermediate layer.

5. The strain sensing element according to claim 1, wherein the first magnetic layer comprises a region having a crystalline structure, and the region contacts the magnetic coupling layer.

6. The strain sensing element according to claim 1, wherein an absolute value of the second magnetostriction constant is larger than an absolute value of the first magnetostriction constant.

7. The strain sensing element according to claim 1, wherein a thickness of the magnetic coupling layer is not less than 0.8 nm and not more than 1 nm.

8. The strain sensing element according to claim 1, wherein a thickness of the magnetic coupling layer is not less than 0.3 nm and not more than 0.6 nm.

9. The strain sensing element according to claim 1, wherein the first magnetization has a component opposite to the second magnetization.

10. A pressure sensor comprising:
    a supporting part;
    a substrate supported by the supporting part, the substrate being deformable; and
    a strain sensing element provided on the substrate,
    the strain sensing element including:
      a reference layer;
      a first magnetic layer;
      a second magnetic layer, the first magnetic layer being provided between the reference layer and the second magnetic layer;
      a spacer layer provided between the reference layer and the first magnetic layer,
      and
      a magnetic coupling layer provided between the first magnetic layer and the second magnetic layer, the magnetic coupling layer including at least one selected from a group consisting of Ru, Rh and Ir,
    both of a first magnetization of the first magnetic layer and a second magnetization of the second magnetic layer being configured to change in accordance with a deformation of the substrate, and
    a first polarity of a magnetostriction constant of the first magnetic layer being the same as a second polarity of a magnetostriction constant of the second magnetic layer.

11. The sensor according to claim 10, comprising a plurality of the strain sensing elements which are provided on the substrate.

12. The sensor according to claim 11, wherein:
    a circumscribing rectangle that circumscribes an shape of the substrate includes:
      a first side;
      a second side separated from the first side;
      a third side connected to one end of the first side and one end of the second side;
      a fourth side connected to another end of the first side and another end of the second side; and
      a centroid of the circumscribing rectangle,
    the circumscribing rectangle includes a first region surrounded by:
      a line segment linking the centroid and the one end of the first side;
      a line segment linking the centroid and the other end of the first side; and
      the first side, and
    at least two among the plurality of strain sensing elements are provided on a part of the substrate overlapping the first region.

13. The sensor according to claim 12, wherein each of positions of at least two of the plurality of strain sensing elements differs from each other in a direction parallel to the first side.

14. The sensor according to claim 11, wherein at least two of the plurality of strain sensing elements are stacked on the substrate.

15. The sensor according to claim 11, wherein at least two of the plurality of strain sensing elements are electrically connected in series.

16. A blood pressure sensor including the pressure sensor according to claim 10.

17. A touch panel including the pressure sensor according to claim 10.

18. A microphone comprising:
a pressure sensor;
a board; and
a cover, the pressure sensor being provided between the board and the cover,
the pressure sensor including:
- a supporting part;
- a substrate supported by the supporting part, the substrate being deformable; and
- a strain sensing element provided on the substrate, the strain sensing element including:
  - a reference layer;
  - a first magnetic layer;
  - a second magnetic layer; the first magnetic layer being provided between the reference layer and the second magnetic layer;
  - a spacer layer provided between the reference layer and the first magnetic layer, and
  - a magnetic coupling layer provided between the first magnetic layer and the second magnetic layer, the magnetic coupling layer including at least one selected from a group consisting of Ru, Rh and Ir,
both of a first magnetization of the first magnetic layer and a second magnetization of the second magnetic layer being configured to change in accordance with a deformation of the substrate, and
a first polarity of a magnetostriction constant of the first magnetic layer being the same as a second polarity of a magnetostriction constant of the second magnetic layer.

* * * * *